US011063913B2

(12) United States Patent
Efremov et al.

(10) Patent No.: US 11,063,913 B2
(45) Date of Patent: *Jul. 13, 2021

(54) SYSTEM AND METHOD FOR ANONYMOUSLY ROUTING DATA BETWEEN A CLIENT AND A SERVER

(71) Applicant: AO Kaspersky Lab, Moscow (RU)

(72) Inventors: Andrey A. Efremov, Moscow (RU);
Dmitry V. Shmoylov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 255 days.

This patent is subject to a terminal disclaimer.

(21) Appl. No.: 16/101,689

(22) Filed: Aug. 13, 2018

(65) Prior Publication Data

US 2019/0306127 A1 Oct. 3, 2019

(30) Foreign Application Priority Data

Mar. 30, 2018 (RU) .......................... RU2018111486

(51) Int. Cl.
| | |
|---|---|
| *H04L 29/06* | (2006.01) |
| *H04L 29/08* | (2006.01) |
| *H04L 9/06* | (2006.01) |
| *G06F 21/60* | (2013.01) |
| *G06F 21/62* | (2013.01) |
| *G06F 16/25* | (2019.01) |
| *H04L 9/08* | (2006.01) |

(52) U.S. Cl.
CPC ........ *H04L 63/0421* (2013.01); *G06F 16/258* (2019.01); *G06F 21/602* (2013.01); *G06F 21/6254* (2013.01); *H04L 9/0643* (2013.01); *H04L 9/0825* (2013.01); *H04L 63/0442* (2013.01); *H04L 67/10* (2013.01); *H04L 67/42* (2013.01)

(58) Field of Classification Search
CPC ............... H04L 63/0421; H04L 9/0825; H04L 63/0442; H04L 67/10; H04L 9/0643; H04L 67/42; H04L 63/0209; H04L 67/1097; H04L 67/146; H04L 9/0894; H04L 9/0891; G06F 16/152; G06F 21/6254; G06F 21/602; G06F 16/258
See application file for complete search history.

(56) References Cited

U.S. PATENT DOCUMENTS

| | | | |
|---|---|---|---|
| 8,600,050 B1 | 12/2013 | Tao et al. | |
| 8,601,598 B2 * | 12/2013 | Ozzie | .................. H04L 63/0428 726/27 |
| 8,739,265 B2 | 5/2014 | Ang et al. | |
| 9,122,866 B1 | 9/2015 | Kolman et al. | |
| 2010/0318782 A1 | 12/2010 | Auradkar et al. | |

(Continued)

FOREIGN PATENT DOCUMENTS

EP 3293933 A1 3/2018

*Primary Examiner* — Kevin Bechtel
*Assistant Examiner* — Hamid Talaminaei
(74) *Attorney, Agent, or Firm* — Arent Fox LLP; Michael Fainberg

(57) ABSTRACT

Disclosed are systems and methods for routing during statistics collection. A method is described of exchanging data in a client/server architecture across a node with an anonymization module situated in a regional network different from the network in which the server is located and not being in the same intranet as the server or the client when making the request.

13 Claims, 17 Drawing Sheets

(56) References Cited

U.S. PATENT DOCUMENTS

| | | |
|---|---|---|
| 2012/0259877 A1 | 10/2012 | Raghunathan et al. |
| 2013/0318347 A1* | 11/2013 | Moffat ................. H04L 9/0894 713/168 |
| 2014/0047551 A1 | 2/2014 | Nagasundaram et al. |
| 2014/0101774 A1 | 4/2014 | Armington |
| 2016/0134595 A1* | 5/2016 | Lavinio ................. G06F 21/606 713/168 |
| 2016/0203336 A1* | 7/2016 | Nambiar ............ G06F 21/6245 726/26 |
| 2017/0243028 A1* | 8/2017 | LaFever .............. G06F 21/6263 |
| 2018/0063182 A1 | 3/2018 | Jones et al. |
| 2019/0124051 A1* | 4/2019 | Soon-Shiong ...... H04L 63/0442 |

\* cited by examiner

SYSTEM AND METHOD FOR ANONYMOUSLY ROUTING DATA BETWEEN A CLIENT AND A SERVER

CROSS-REFERENCE TO RELATED APPLICATIONS

This application claims benefit of priority under 35 U.S.C. 119(a)-(d) to a Russian Patent Application No. 2018111486 filed on Mar. 30, 2018, which is incorporated by reference herein.

FIELD OF TECHNOLOGY

The present disclosure relates generally to the field of information security technology, more specifically, to systems and methods of assuring anonymity for data routing in a client-server architecture.

BACKGROUND

Changes in legislation around the world are forcing information security specialists to seek out new methods for managing data coming from personal electronic devices. For example, in the Russia Federation a law was signed whereby the personally identifiable information of Russians used by Internet services must be kept on the territory of Russia; in Switzerland, banks are also required not to allow user data to leave the juridical territory of the federal government; and in a number of countries, personally identifiable information is prohibited from being kept in open form. The solutions being developed should not make the work of the users of computer systems more difficult and be as transparent as possible to the users in their operation.

With the advent of the General Data Protection Regulation (GDPR), the quantity of personally identifiable information being kept in a network infrastructure on the part of various services and being received from users is trending toward a minimum. It is necessary to provide distributed storage and processing of data obtained from users without losing its uniqueness.

These factors are causing difficulties in the implementation of a cloud infrastructure in the corporate and private sector, so that technical solutions are appearing on the market which can take into account the requirements of the legislation.

Existing approaches have the drawback of requiring the installation of an additional agent on a user's device, which makes it more difficult for the user to work with a remote server and makes the interaction nontransparent. In another case, where no agent is installed, a total encryption of the original data is performed regardless of the content, which also is inconvenient and creates an additional burden. Nor is proper consideration given to the location of the client and the server. A solution is needed which is able to solve these drawbacks.

SUMMARY

Aspects of the present disclosure are configured to route data in a client-server architecture with anonymity being assured for the data being transmitted and without loss of the completeness and representativeness of the information, as required by the server for analysis and compilation of statistics (i.e., in compliance with data protection regulations). The technical result of the present disclosure is to provide anonymization of a client's data when transmitting data in a client-server architecture.

According to one aspect of the present disclosure, a method is provided for transmitting data between a client and a server using a network node with an anonymization module situated in a first regional network different from a second regional network in which the server is located and not being in a same intranet as the server and the client when making a request. The method includes generating, by the client, a request data structure for transmission to the server, and identifying at least two substructures in the data structure of the request. A first substructure containing critical data and a second substructure does not contain critical data, wherein the critical data comprises data for which a regulation associated with a jurisdiction the client is located imposes restrictions on the gathering, storing, accessing, disseminating and processing. The method further includes performing a transformation on the data of the first substructure containing the critical data by the anonymization module, and dispatching the request data structure with the transformed substructure containing the critical data to the server. A response data structure to the request is formulated, wherein the response data structure includes a third substructure containing the transformed critical data as transformed by the anonymization module and a fourth substructure not containing critical data. The response data structure is dispatched from the server to the network node with the anonymization module, wherein an inverse transformation of the data of the third substructure of the response to the request that contains the critical data is performed by the anonymization module and the obtained response data structure is rerouted to the client.

In another aspect, the transformation performed by the anonymization module is performed using a one-way function such that the server cannot perform an inverse transformation on the data of the first substructure.

In another aspect, a transformation of data of the fourth substructure of the response data structure not containing critical data is performed at the server.

In another aspect, the inverse transformation of data of the fourth substructure of the response data structure not containing critical data is performed by the client.

In another aspect, the transformation by the server is perform by a one-way function such that the anonymization module cannot perform an inverse transformation on the data of the fourth substructure.

In another aspect, the transformation of data of the fourth substructure of the response data structure not containing critical data is performed using asymmetrical encryption, where a private key is stored at the client and a public key is stored at the server.

In another aspect, the transformation is done by an encryption module.

In another aspect, the transformation includes an encryption of the substructures, and the inverse transformation comprises a decryption of the substructures.

In another aspect, the request data structure generated at the client is dispatched from the client to the server via the anonymization module of the network node.

In another aspect, the substructures containing critical data and not containing critical data structure of the request are identified by the anonymization module.

In another aspect, the first substructure containing critical data and the second substructure not containing critical in the request data structure are identified by the client prior to being dispatched to the server across the network node with the anonymization module.

In another aspect, the second substructure that does not contain critical data is transformed by the client.

In another aspect, the inverse transformation of the substructure not containing critical data is performed by the server prior to formulating the response data structure.

In another aspect, the transformation and the inverse transformation are performed using asymmetrical encryption.

In another aspect, the response data structure dispatched to the client does not include the substructure containing critical data.

In another aspect, the critical data comprises personally identifiable information.

In another aspect, the critical data includes confidential data, wherein confidential data is data kept in accordance with laws of a country in whose jurisdiction a user of the client is located.

According to another aspect of the present disclosure, a system is provided for transmitting data. The system includes a client, a server, and a network node situated in a first regional network different from a second regional network in which the server is located and not being in a same intranet as the server and the client when making a request, wherein the network node includes an anonymization module. The client is configured to generate a request data structure for transmission to the server. At least two substructures in the request data structure are identified, wherein a first substructure containing critical data and a second substructure does not contain critical data, wherein the critical data comprises data for which a regulation associated with a jurisdiction the client is located imposes restrictions on the gathering, storing, accessing, disseminating and processing. The anonymization module is configured to perform a transformation on the data of the first substructure containing the critical data. The network node is further configured to dispatch the request data structure with the transformed substructure containing the critical data to the server. The server is configured to formulate a response data structure to the request, wherein the response data structure includes a third substructure containing the transformed critical data as transformed by the anonymization module and a fourth substructure not containing critical data. The server is further configured to dispatch the response data structure to the network node with the anonymization module. The anonymization module is configured to perform an inverse transformation of the data of the third substructure of the response to the request that contains the critical data and the obtained response data structure is rerouted to the client.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for routing anonymous data in a client-server architecture. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
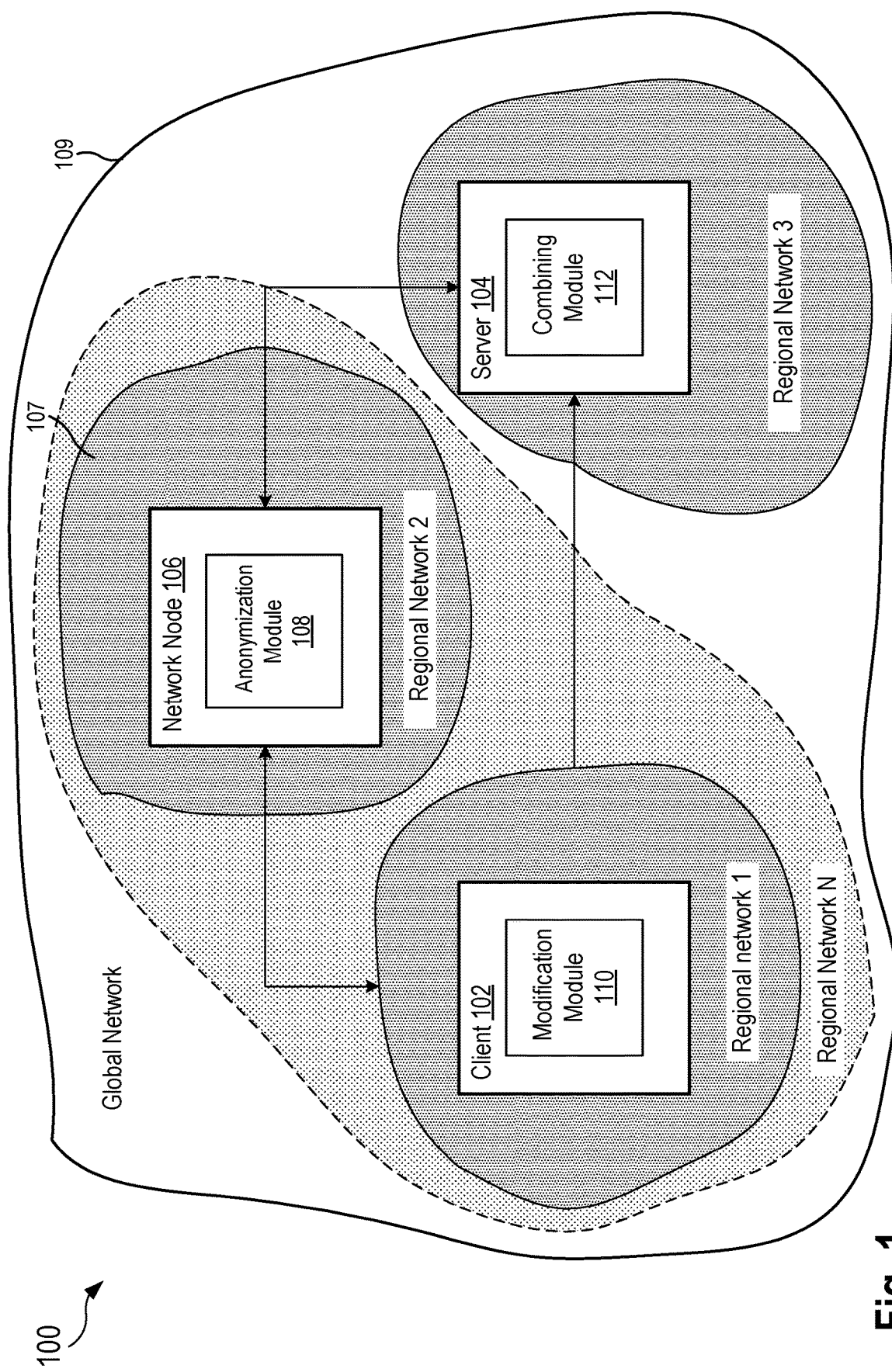
FIG. 1—illustrates a system for data routing in a client-server architecture.

FIG. 1 illustrates a system 100 for data routing in a client-server architecture. The system 100 includes a client 102, a server 104, and a network node 106 with an anonymization module 108. The server 104 may be part of a cloud infrastructure (not shown in the figure), while the client may be a user's device. The node 106 with the anonymization module 108 may be situated in a regional network 107 different from the regional network in which the server is situated (i.e., regional-network-2 and regional-network-3), and is not located in the same intranet as the server 104 or the client 102. As used herein, a regional network 107 refers to a geographically dispersed network, bringing together computers at different points into a whole by communication means, the set of regional networks forming a global network 109. In the context of the present disclosure, different regional networks 107 are not only geographically separated, but also are located in different jurisdictions (i.e., possibly subject to different regulations), so that in the context of the present disclosure the different regional networks may also include networks bringing together the nodes of countries (national networks). For example, in FIG. 1, the Regional Network "1" is the network of the United States of America, the Regional Network "2" is the network of Germany and/or the European Union, and Regional Network "3" is the network of the Russian Federation.

The global network 109 of FIG. 1 is the totality of all the regional networks 107, or the world network, the Internet. In the terminology of the GDPR, for example, the regional network of the RF in which the server is situated will be considered to be a regional network of a third country.

In a particular instance, the regional network 107 of the node 106 with the anonymization module 108 is also different from the regional network of the client 102. The arrows in FIG. 1 are depicted as originating from a network, and not from the client, since in the general case the external IP address is visible thanks to the use of internal address hiding technologies, particularly Proxy, NAT (Network Address Translation).

The client 102 may include a modification module 110 configured to divide one or more data structures (e.g., which are created for dispatching data from the client to the server) into substructures and to select a route for the obtained substructures. A data structure is a collection of data values generated and maintained by components of the system 100, including the client 102 and the server 104. It is noted that some of the data values in the data structure may be "personal data", and therefore subject to data privacy policies and regulations. A substructure then is a type of data structure that contains a subset of the data values from the original data structure. By way of example, the data values in the data structure may include data submissions, user requests, data queries and/or query results, log data, state data of an application, records of user transaction(s), user-generated content, and other forms of data suitable for exchange in a client-server architecture. In some examples, a data structure may be in-memory data structures (e.g., linked lists, hash tables, trees, arrays, database records), or on-disk data structures (e.g., files, blobs). In other examples, a data structure may be one or more network data packet(s) configured for the transmission of the data values contained herein from the client to the server. The data structure may be serialized, in text format, in a structured format (e.g., Extendible Markup Language or XML, JavaScript Object Notation or JSON), or other format for information exchange.

There may be various criteria for the division of a data structure into substructures. One such criterion may be the presence of personally identifiable information or special categories thereof (in the terminology of the GDPR), whereby the data structure is divided up such that one substructure contains the personally identifiable information (also referred to as "PII") or special categories thereof, another substructure includes data which is not personally identifiable information (i.e., the other substructure does not contain PII). The characterization and assignment of data as personal data can be dictated, for example, by the laws of the country in the jurisdiction of which the user of the device being the client in the system being described is situated, in other words, according to the location of the data source.

Another criterion for the division of a data structure into substructures is the presence of critical data. Critical data is data on which the law or an authorized entity imposes restrictions on its gathering, storage, and processing. Critical data is generally sensitive with regard to divulgence, dissemination, and leakage, since the occurrence of these events will lead to a violation of the rights and interests of users, as protected by law, and liability is enforced against those who commit infractions of the rules for gathering, storing, accessing, and processing of such data. A particular case of critical data is confidential data (sensitive data) or confidential information. In the context of the present application, confidential data and confidential information are used synonymously. Confidential data refers to data which is protected in keeping with the legislation of the country in the jurisdiction of which the user of the device which is the client in the system being described is located. Confidential data in a particular case includes personally identifiable information (PII) and data containing commercial secrecy, tax secrecy, banking secrecy, medical secrecy, notarial secrecy, attorney secrecy, audit secrecy, communications secrecy, insurance secrecy, last testament secrecy, adoption secrecy, confessional secrecy, investigational secrecy, court proceedings secrecy, information on protected persons, and state secrecy. In one aspect, the critical data may include sensitive personal data, as specified under the GDPR, which is any data that reveals racial or ethnic origin, political opinions, religious or philosophical beliefs, trade union membership, data concerning health or sex life and sexual orientation, and genetic data or biometric data (e.g., for the purpose of uniquely identifying a natural person).

The anonymization module 108 is configured to perform a transformation and the inverse transformation of the substructures whose route passes through the node 106 with the anonymization module 108. In one aspect, a transformation of substructures may be a transformation of the data contained in the substructure. In a particular instance, the methods of transformation of the data of the substructures may include one or more of quantization, sorting, merging (pasting), grouping, data set configuration, table substitution of values, calculated values, data encoding, encryption, and normalization (scaling).

Certain kinds of transformation may be applied not only to individual data in the substructure, but also to the substructure as a whole, for example tokenization and/or encryption. In a particular instance, the transformation is carried out with no possibility of an inverse transformation by any means other than the anonymization module 108 of the node. An inverse transformation refers to a transformation which restores the original form of an object of transformation (data, a substructure) prior to the transformation. Generally, a transformation may be any mapping (function) of a set onto itself, or in other words, transformations are mappings which translate a certain set into another set.

A substructure from the same client may be transformed by the anonymization module 108 by the same method or by different methods. If the transformation is carried out by the same method, then the transformed substructure or the data of the substructure from the same client will have an identical appearance; otherwise, they will differ and it will not be possible to compile statistics for the same client (perform a profiling).

The server 104 may include a combining module 112, which is configured to combine a data structure that was divided at the client side. The combining module 112 may combine data, for example, on the basis of unique identifiers, which are assigned to each substructure during the division and are identical for the substructures of the same structure. The combining module 112 receives substructures arriving at the server 104 by various network routes and combines them into a structure. The structure will clearly be different from the original one, divided at the client side, because the substructures passing through the node with the anonymization module 108 will be transformed by that module 108. The resulting structure may be saved in a database (not shown in the figures).

In a particular instance, the anonymization module 108 obtains from the client a structure not divided into substructures by the modification module 110 of the client (for example, the structure of a request for the server), in which case, for the transmission to the server, the anonymization module 108 identifies in the obtained structure the substructures containing PII and performs a transformation of the data of the substructures; examples are given below.

The described system 100 is used for the anonymization of requests being dispatched to the server 104 and responses to these requests being dispatched to the client 102, and also for obtaining data from clients 102 which is used for the compilation of statistics.

Figure 2:
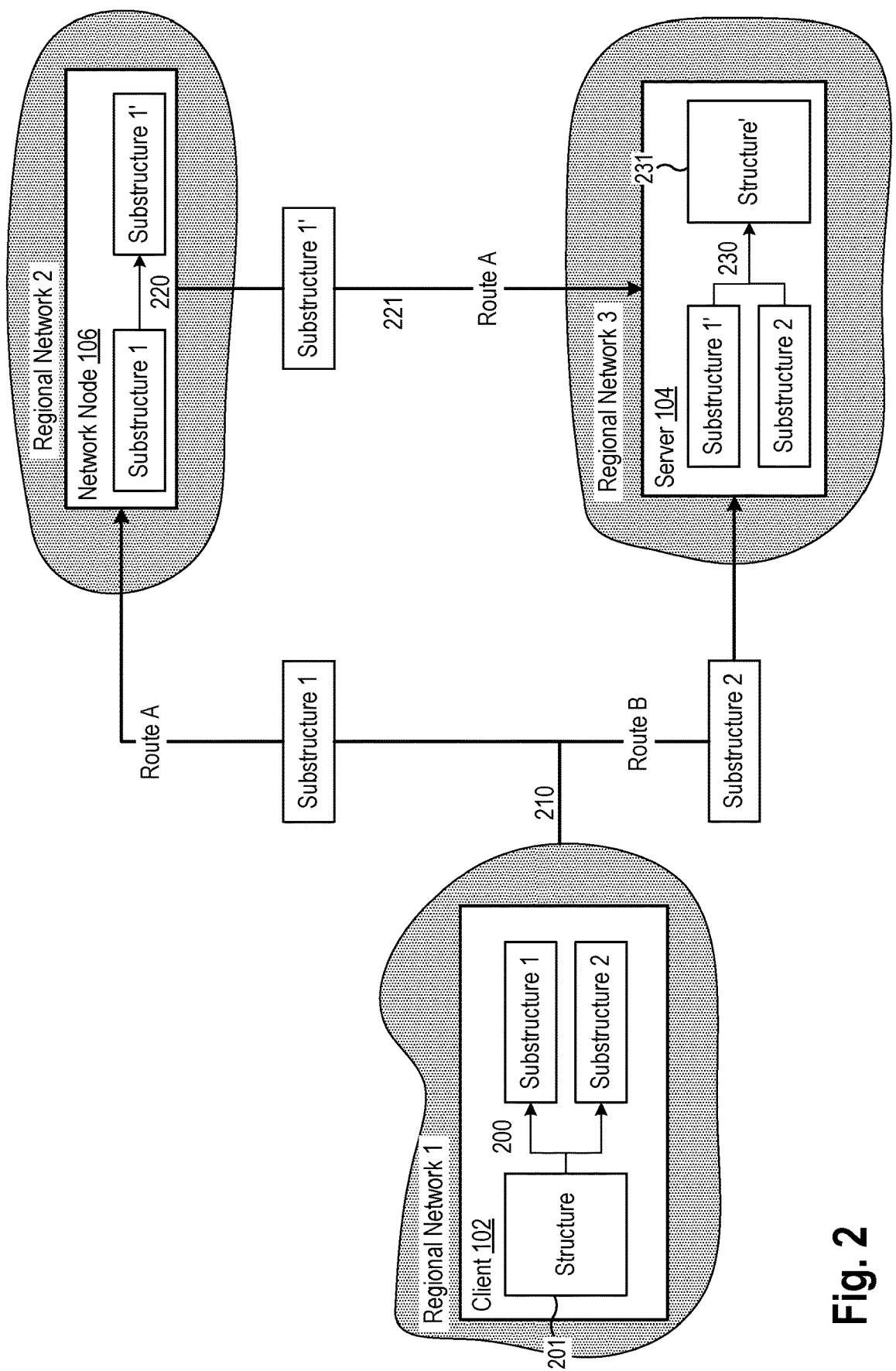
FIG. 2—illustrates a variant of a method of data routing in a client-server architecture with the data structure being divided into substructures by the client.

FIG. 2 is a block diagram showing exemplary operations according to a method of routing data in a client-server architecture, which is used in a particular instance for obtaining data from clients for statistics compilation. In step 200 the modification module 110 (e.g., executing on the client 102) divides the structure 201 intended for dispatch to the server in accordance with criteria, one such criterion possibly being the presence of PII in the structure, and as a result of the division there is obtained a substructure containing PII (in FIG. 2 this is the Substructure 1, by way of example) and one not containing PII (in FIG. 2 this corresponds to Substructure 2). Here and below, as the example of the criterion we shall use the presence of PII, and not the presence of critical or confidential data, even though what is valid for PII is also valid for critical or confidential data in general in the example aspect of the present disclosure in the context of the present application. In a particular instance, there may be more than one substructure of the first and second type, as well as more than one criterion by which the division is performed.

In step 210 the modification module 110 dispatches (i.e., transmits) the obtained substructures to the server 104, the dispatching occurring by various routes (route A and route B), where one of the routes (e.g., Route A) includes the network node 106 with the anonymization module 108. In an aspect, the modification module 110 may determine at least two routes for dispatching the at least two data substructures based on personal data contained in the one of the data substructures. The network node 106 is situated in a regional network different from the network where the server 104 is located and not in the same intranet as the server or the client 102. When one of the substructures intended for dispatch to the server contains PII, the substructures will be directed to the server via the node with the anonymization module 108 (route A).

Then, in step 220, the substructures passing through the node 106 with the anonymization module 108 are transformed by that module 108 and then sent to the server 104 (step 221) in a transformed state. In the general case, the substructures from the same client are transformed differently at different moments in time. For example, a substructure having a client identifier sent at a first time period is transformed to include an anonymized identifier (AnonymizedID1) which is different a subsequent anonymized identifier (AnonymizedID2) from a substructure sent at a second time even if it came from the same client and had the same client identifier (i.e., Client ID->AnonymizedID1≠AnonymizedID2≠AnonymizedID3 and so on), and this may pertain to all the examples. In a particular case, when it is necessary, for certain security systems, to assemble information (compile statistics) on a particular client, the transformation will be identical for a substructure from the same client (for example, Client ID->AnonymizedID1=AnonymizedID2=AnonymizedID3 and so on).

In conclusion, in step 230 the substructures obtained from the client are combined into a structure 231 (Structure'). Clearly, the resulting structure (Structure') is different from the original one, since at least one substructure has been transformed by the anonymization module 108. The resulting structure 231 will also be used in the database by the infrastructure at the server side. The infrastructure and database are omitted from the figure for clarity of illustration. Individual infrastructure elements such as a request processor 302 and an attack detection module 602 are indicated in other figures. The transformation of the substructures and/or data of the substructures by the anonymization module 108 is conducted in such a way as to exclude the possibility of an inverse transformation of the substructures and/or data of the substructures by any means other than the means of the network node 106 with the anonymization module 108.

Figure 3:
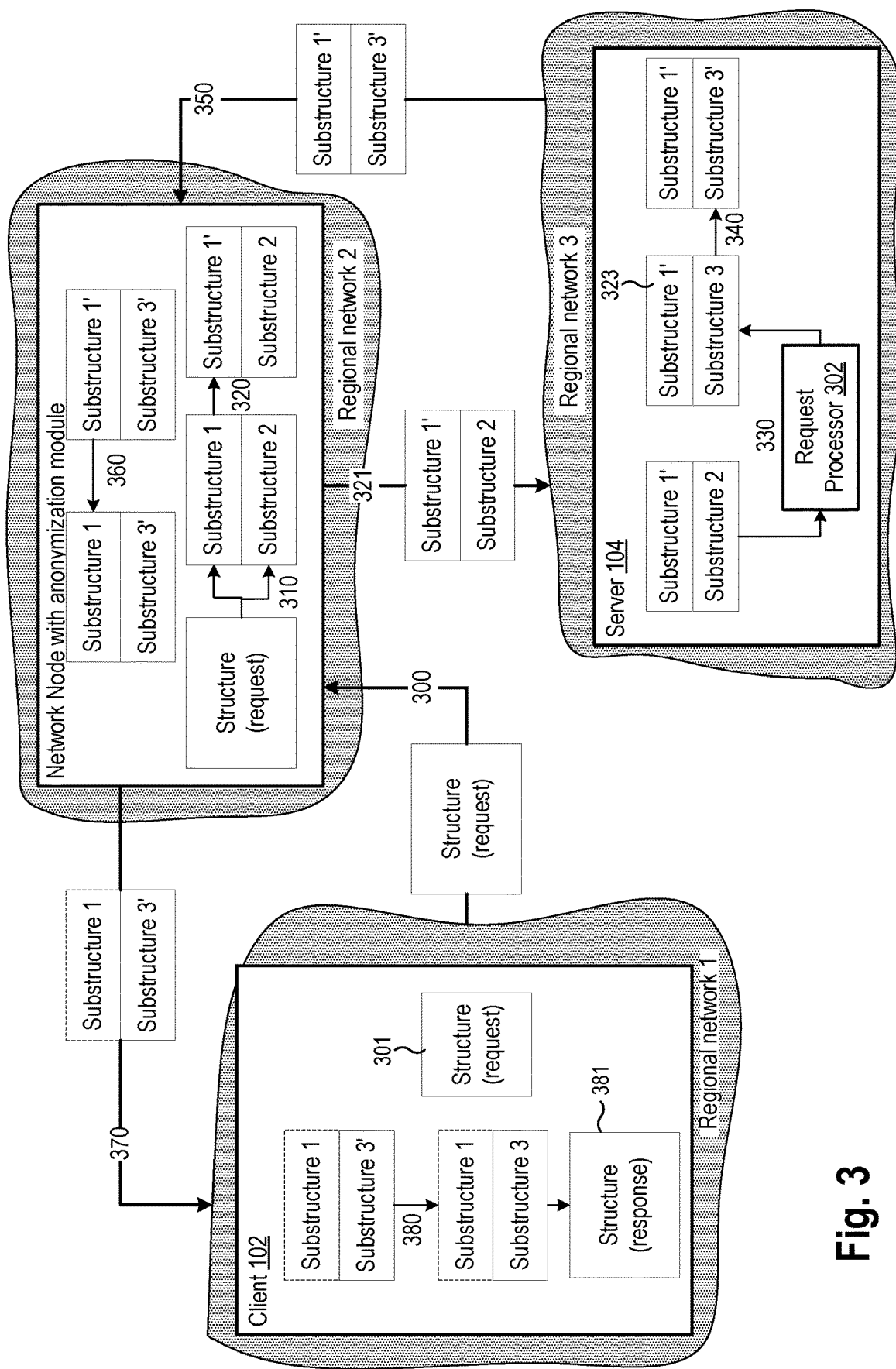
FIG. 3—illustrates a variant of the method of data routing in a client-server architecture when executing a request with identification of substructures in the data structure by an anonymization module.

FIG. 3 shows a routing method which is used, in a particular instance, for executing a request 301 of the client in relation to the server. In step 300 the request formulated at the client side is dispatched by the modification module 110 from the client 102 to the server 104, the route including the network node 106 with the anonymization module 108, said node being situated in a regional network different from the network where the server is located and not being in the same intranet as the server or the client. In a particular instance, some of the request data (not containing confidential data) may be transformed by the modification module 110 at the client side, wherein the transformation may be carried out such that it is impossible for the anonymization module 108 to perform the inverse transformation (step 311 in FIG. 4) and only the server 104 can perform the inverse transformation (step 325 in FIG. 4). By way of example, the transformation and inverse transformation may be performed using asymmetrical encryption techniques, where the client 102 has a public key and the server 104 has a private key. As used herein, unless otherwise indicated, the term "transformation" refers to a forward transformation.

Next, in step 310, the anonymization module 108 identifies substructures in the data structure of the request intended for dispatch to the server in accordance with criteria, one such criterion possibly being the presence of PII, obtaining as a result of the identification a substructure containing PII (in FIG. 3, by analogy with the previous example, this is Substructure 1) and one not containing PII (in FIG. 3 this is Substructure 2). In step 320, the anonymization module 108 is used to perform a transformation (a forward transformation from original to transformed) of the data substructure (and/or the data in the substructure) containing PII, and the anonymization module 108 is used to dispatch the resulting data structure of the request with the transformed substructure containing PII to the server (step 321).

In response to the request received, the server in step 330 generates a response 323 using a request processor 302. In regards to the data of the request which may have been transformed by the client 102 in a particular instance, the server 104 first performs an inverse transformation (step 325 in FIG. 4, as described later). The data structure 323 of the response to the request, in the example with PII, contains the following substructures: (1) at least one substructure(s) containing PII transformed by the anonymization module 108 (Substructure 1', extracted from the request structure); and at least one substructure(s) not containing PII (Substructure 3, containing the body of the response to the request or the payload of the response).

The data not containing PII (Substructure 3) may be transformed (forward transformation) without the possibility of an inverse transformation by the anonymization module 108 (Substructure 3'), this being done in step 340. The inverse transformation of this data may only be performed by the modification module 110 of the client (e.g., asymmetrical encryption in which the server has a public key and the client a private key), in step 350 the resulting data structure 324 of the response to the request is dispatched from the server to the network node with the anonymization module 108. The anonymization module 108 in step 360 is used to perform the inverse transformation of the data substructures of the response 324 to the request containing PII (Substructure 1'). The inverse transformation is done with respect to the data which was transformed in step 320 (inverse transformation from transformed data to original data contained initially in the request from the client). The obtained data structure is redirected to the client (step 370) and the modification module 110 of the client in step 380 is used to perform the inverse transformation of the data substructures of the response to the request not containing PII transformed by the server in step 340. As a result, the client 102 generates a data structure 381 containing data substructures of the response to the request not containing PII transformed by the server.

Figure 4:
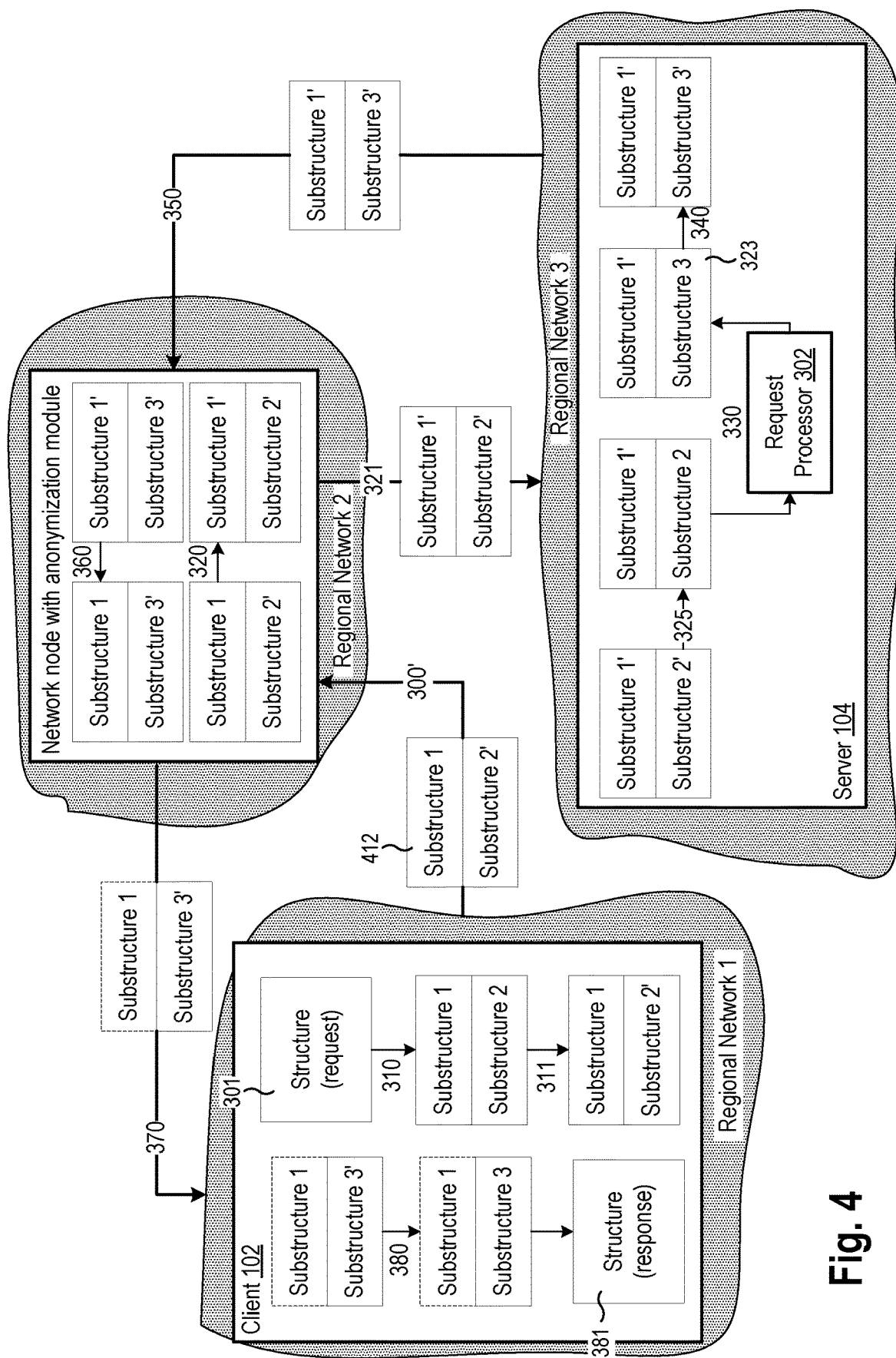
FIG. 4—illustrates a variant of the method of data routing in a client-server architecture with identification of substructures in the data structure by the client.

FIG. 4 shows a variant of the method shown in FIG. 3, but in this variant step 310 for identifying the substructures is performed not by the anonymization module 108, but by the modification module 110 of the client, followed by transformation of the substructure in step 311. By analogy with the variant in FIG. 3, the substructure not containing PII (Substructure 2) is subjected to the transformation. Therefore, step 300' in FIG. 4 differs from the analogous step 300 of the method in FIG. 3 in that it is not the original data structure of the request which is sent to the node with the anonymization module 108, but rather the transformed structure 412 after performing steps 310 and 311. Accordingly, in this variant, step 325 is added, where there is performed at first an inverse transformation of the substructure (in the example, Substructure 2', not containing PII) that was transformed in step 311, before performing step 330.

Figure 5:
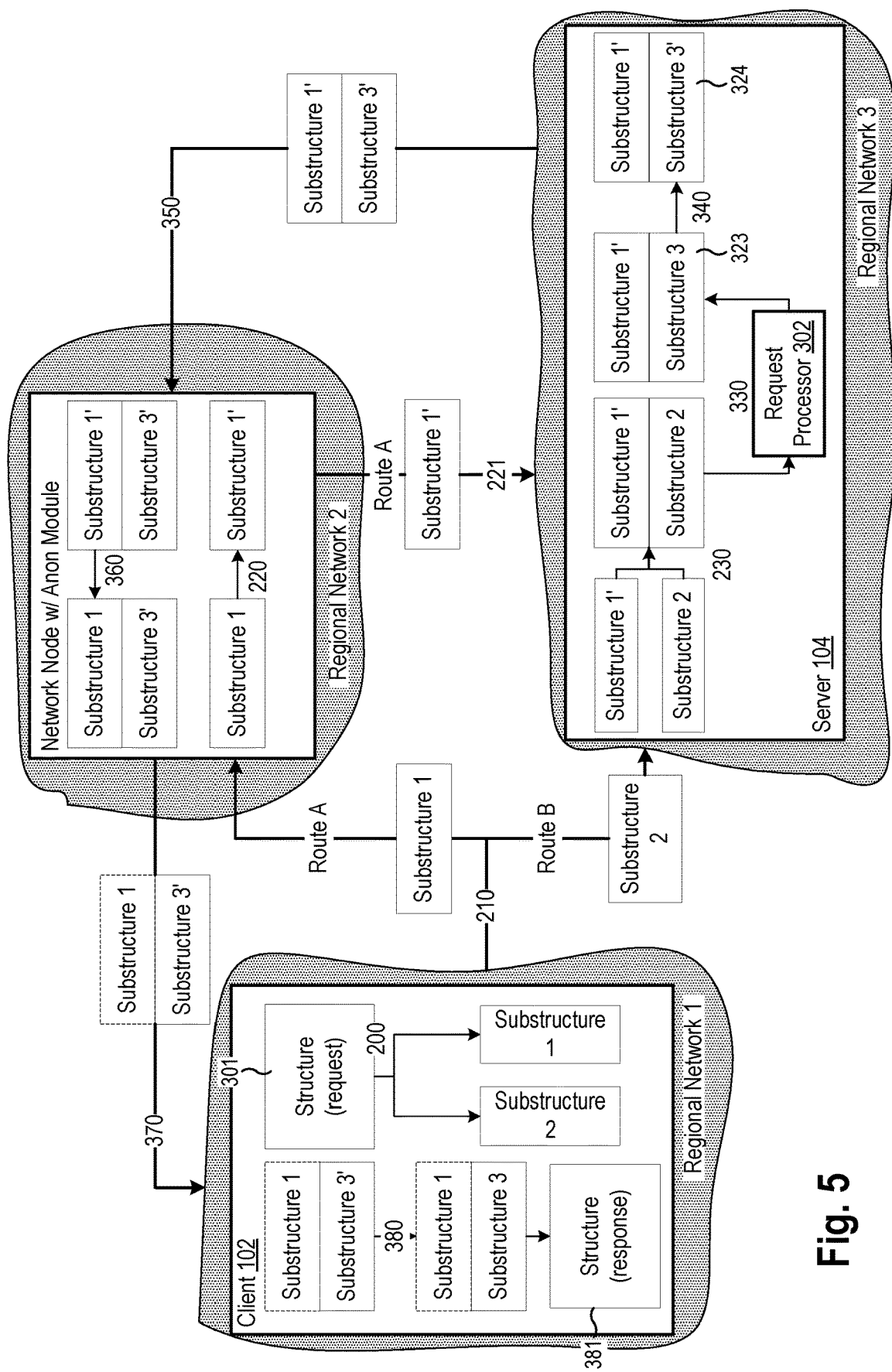
FIG. 5—illustrates a variant of the method of data routing in a client-server architecture when executing a request with division of the data structure into substructures by the client.

FIG. 5 shows a variant of the method of data routing in a client-server architecture in which steps 200 to 230 are analogous to the steps of the method shown in FIG. 2, while steps 300 to 380 are analogous to the steps of the method shown in FIG. 3. In a particular case, the Substructure 2 before being dispatched directly to the server may first be transformed, by analogy with step 311 in FIG. 4, and then step 325 is added in the diagram of the method, besides step 311.

In a particular instance, in all aspects of the method shown in FIG. 3.-FIG. 5 the data structure dispatched to the client 102 by the node 106 with the anonymization module 108 in step 370 does not contain a data substructure with PII (in the examples, Substructure 1). That substructure needs to be saved until this step, in order to determine the addressee of the response; after this, there is no need for it in the particular instance.

Figure 6A:
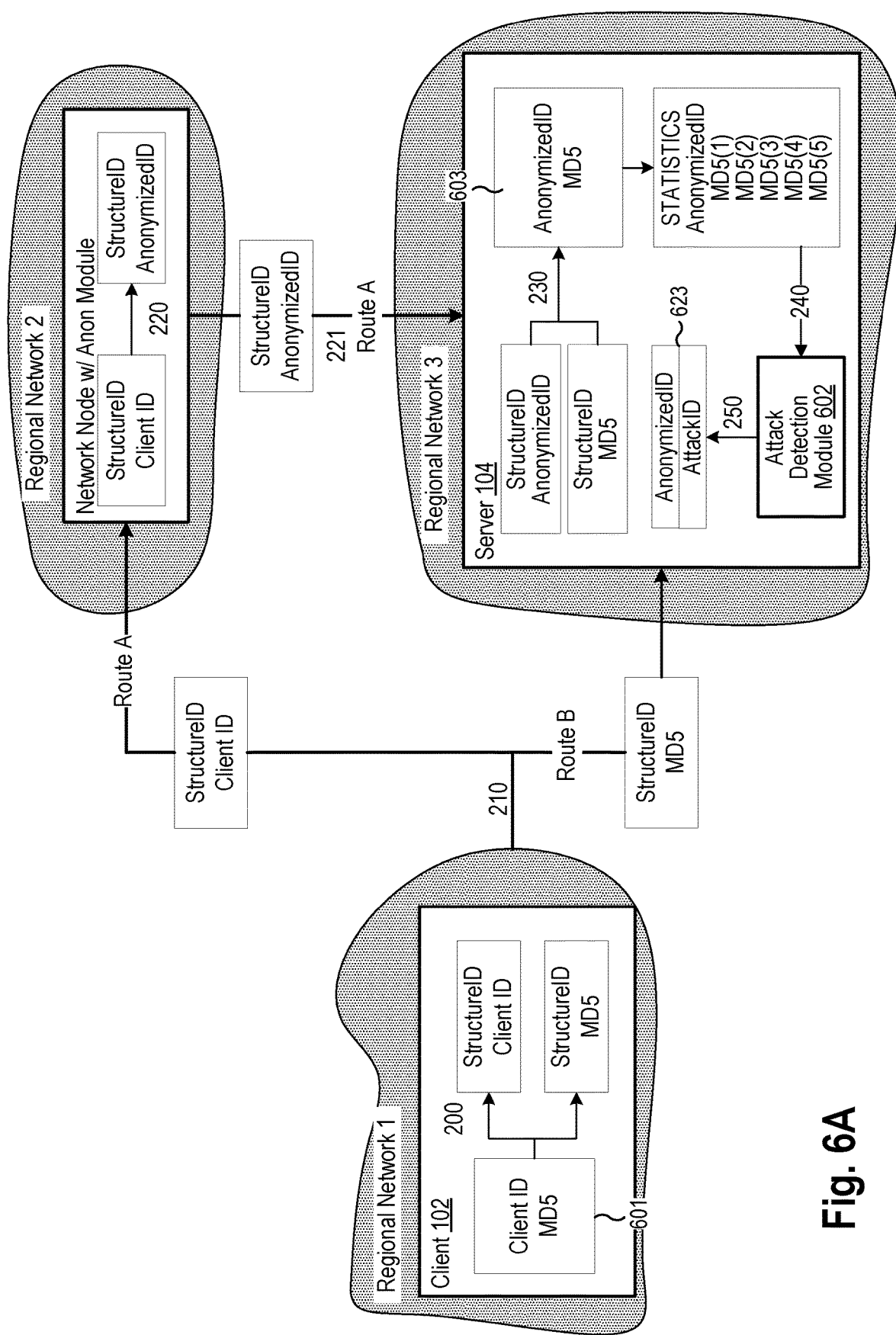
FIG. 6A—illustrates an exemplary aspect of the method of data routing in a client-server architecture when dispatching data (for the compilation of statistics) with division of the data structure into substructures by the client.

FIG. 6a shows exemplary operations of the method shown in FIG. 2. The client 102 is communicatively connected to a system for remote detection of targeted attacks, such as an attack detection module 602, located on the server side. To permit full operation of the attack detection module 602, it may be necessary to obtain information from the client 102 as to files with malicious code (malicious files) detected at various times and to compile statistics on the basis of the information obtained (often, in compliance with the national legislation on personally identifiable information, this still needs to be done anonymously). Upon detecting several such malicious files based on information received from the client, a conclusion is made at the server side that a targeted attack has been detected on the client.

For the transmission of information to the server pertaining to the malicious file detected, the client 102 generates a data structure 601 which includes a client identifier ("clientID") and information pertaining to the malicious file detected ("MD5") of the malicious file detected. In step 200 the modification module 110 divides the formed data structure 601 intended for dispatch to the server into substructures, obtaining as a result of the division a substructure containing the Client ID and a substructure containing the MD5 of the file. In order to know which structure the substructures are a part of, they are assigned an identifier (in the figure the identifier is denoted as StructureID). In step 210 the modification module 110 of the client transmits the obtained substructures to the server 104, the transmission occurring by different routes (route A and route B), where one of the routes (route A) includes a network node 106 with the anonymization module 108, said node 106 being situated in a regional network different from the network where the server is located, and not being in the same intranet as the server or the client. The substructure containing the Client ID is directed to the server 104 across the node 106 with the anonymization module 108 (route A). In step 220 the anonymization module 108 performs the transformation of the client ID, where the client ID is saved at the node, and replaces it in the substructure with the token AnonymizedID (in a particular instance, the client ID may be encrypted). The obtained substructure is dispatched to the server (step 221). In conclusion, in step 230 the substructures received from the client are combined into a structure 603. Clearly, the resulting structure 603 differs from the original one (601), since at least one substructure was transformed by the anonymization module 108. The resulting structure 603 is saved at the server 104 (or in any given database of the infrastructure to which the server belongs) and will be used by the server to assemble information (denoted in the figure as STATISTICS) on the client 102 from whom the structure was obtained. In step 240 the assembled information will be used by the attack detection module 602 and if the attack detection module 602 detects an attack then in step 250 the attack detection module 602 generates a data structure 623 containing a substructure with the AnonymizedID and a substructure containing information on the attack (denoted in the figure as AttackID); the obtained structure 623 will be addressed to the client to give notice of the attack.

Figure 6B:
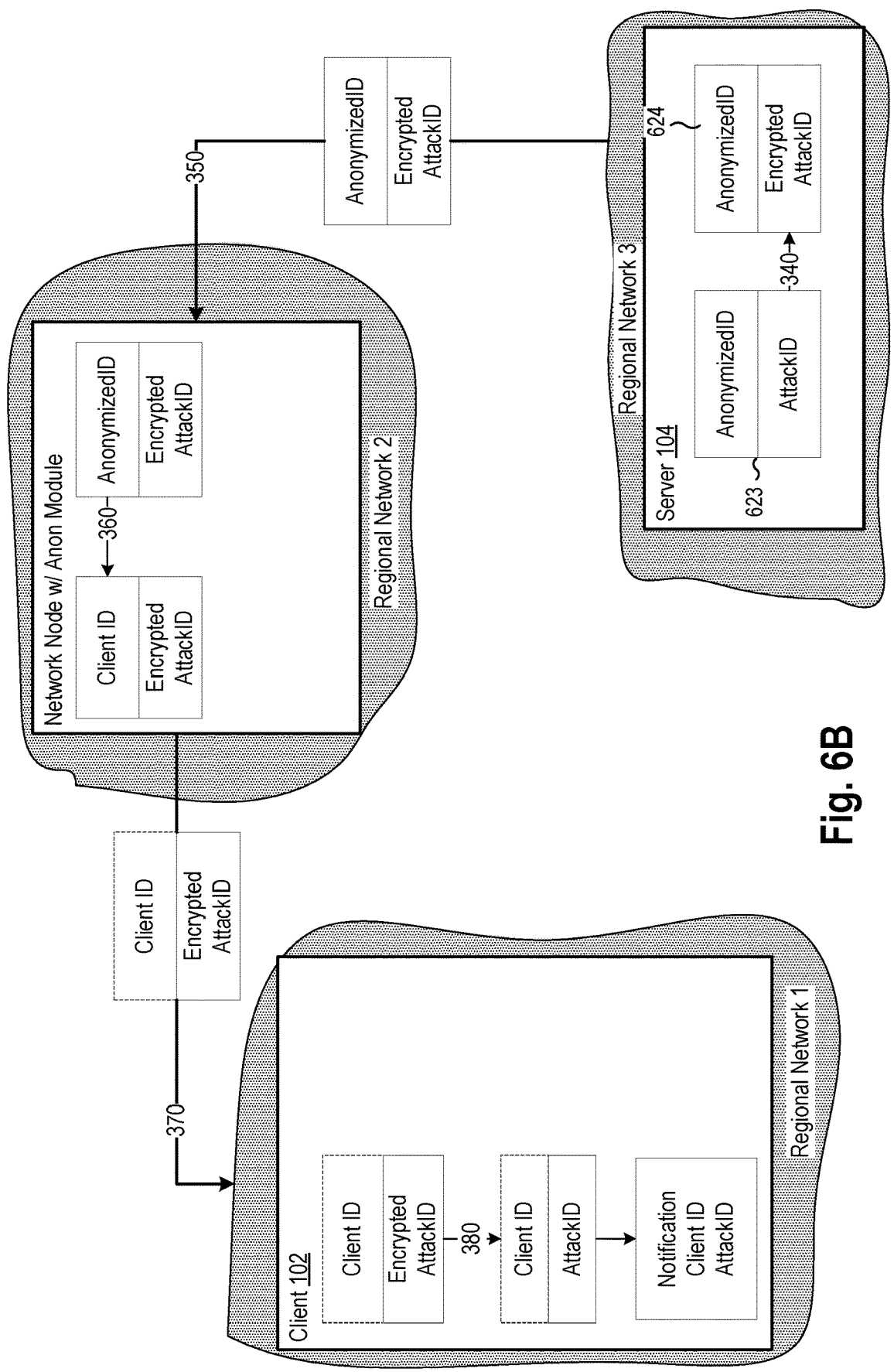
FIG. 6B—illustrates an exemplary aspect of the method of data routing in a client-server architecture upon detecting a targeted attack on the client based on gathered information by the method of FIG. 6A.
Figure 7:
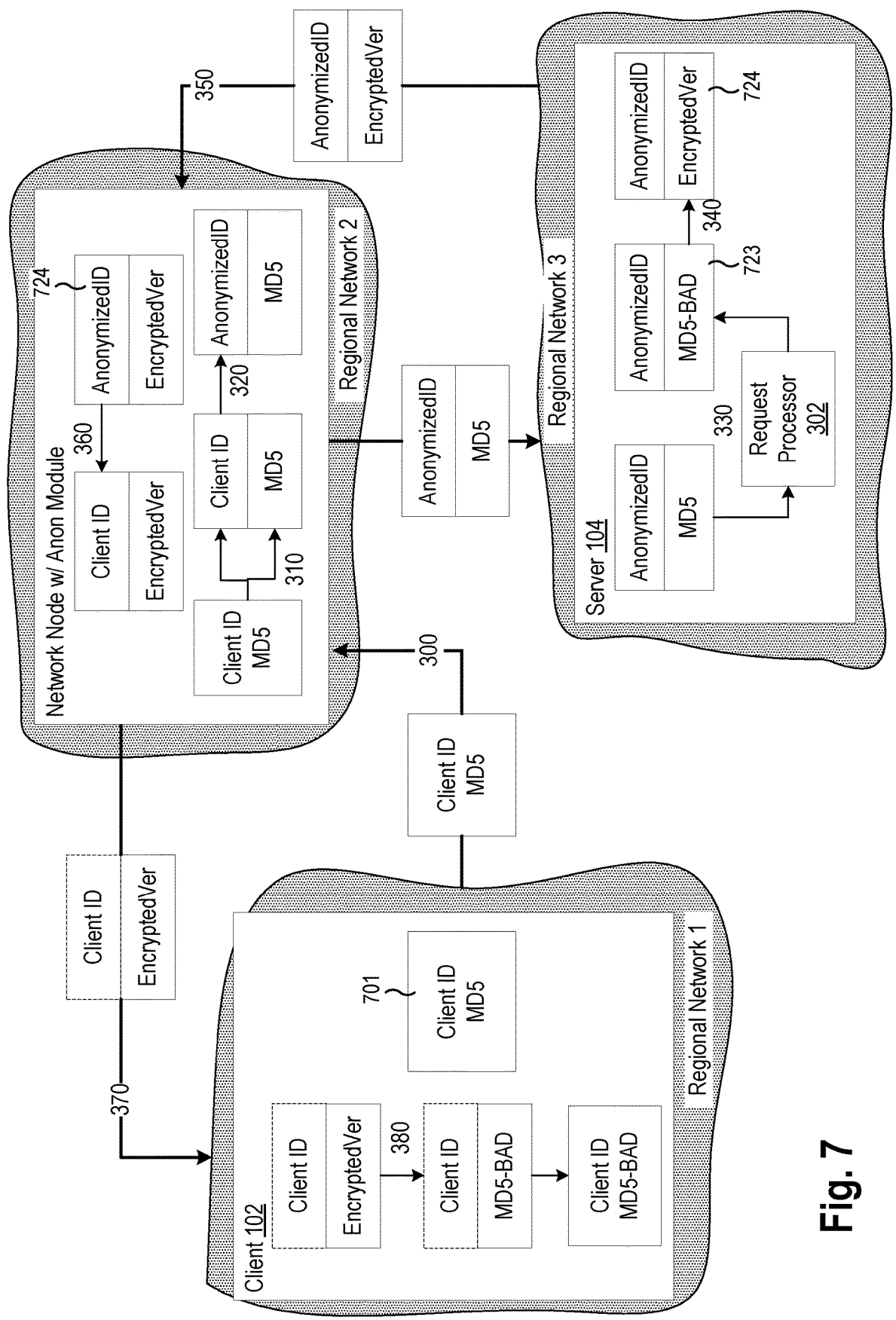
FIG. 7—illustrates an aspect of the method of data routing in a client-server architecture when executing a request with identification of substructures in the data structure by the anonymization module.

An example of the method of dispatching is shown in FIG. 6b, steps 340 to 380 being analogous to the steps of the example shown in FIG. 7. In a particular instance, information about the attack might not be transformed, but rather be dispatched in open form; in that case, the example will lack the steps 340 and 380. In the aspects shown in FIG. 6b as well as in the other Figures of the present disclosure, optional and alternative aspects are depicted in dashed outline or in a light font, such as the clientID field in the obtained response in step 370.

FIG. 7 shows another example operation of the present disclosure. The client device 102 has detected a new file, which needs to be scanned for the presence of malicious code by the server 104. For this, it is necessary to dispatch information about the file to the server, in the present example this being the file's MD5, for which the client generates a request data structure 701. For this purpose, in order to tell the server to whom the response should be dispatched, the modification module 110 (e.g., executing at the client 102) inserts in the request data structure 701 a client ID, such that the request data structure 701 includes the client ID and the file MD5. In step 300 the generated request is dispatched by the modification module 110 to the server, the route including the network node 106 with the anonymization module 108, said node being situated in a regional network different from the network where the server is located, and not being in the same intranet as the server or the client. Next, in step 310, the anonymization module 108 identifies substructures in the structure 701 intended for dispatch to the server, obtaining as a result of the identification a substructure containing the client ID and a substructure containing the file's MD5. In step 320, the anonymization module 108 performs a transformation of the client ID, where the client ID is saved at the node 106, and this is replaced in the substructure by the token AnonymizedID (in a particular instance, the client ID may be encrypted). The obtained data structure of the request with the transformed substructure is dispatched to the server (step 321). A response 723 to the request received is generated in step 330 by the request processor 302 of the server 104. The request processor 302 extracts from the structure the file MD5 and issues a verdict indicating that the file under analysis at the client is malicious, for example, "MD5-BAD". The data structure 723 of the response to the request contains the following substructures: (1) at least one substructure containing the token AnonymizedID (or the client ID encrypted by the anonymization module 108); and (2) at least one substructure containing a verdict for the file (MD5-BAD).

In this regard, the verdict in step 340 is transformed by the server 104 without possibility of an inverse transformation by the anonymization module 108, for example by encrypting it with a public key (the transformed verdict is denoted in the figure as EncryptedVer), the private key is kept at the client, and the inverse transformation may only be performed by the modification module 110 of the client. In step 350 the obtained data structure 724 of the response to the request is dispatched from the server to the network node 106 with the anonymization module 108. The anonymization module 108 in step 360 performs the inverse transformation of the data substructure of the response 724 to the request containing the token AnonymizedID by the anonymization module 108, where in the case of a token the token is replaced by the previously saved client ID, and in the case where the client ID was encrypted it is then decrypted. Thus, the transformation is performed with regard to the data which was transformed in step 320. The obtained data structure is redirected to the client (step 370) and the modification module 110 of the client in step 380 performs the inverse transformation of the verdict transformed by the server in step 340; in the example, it is decrypted with the aid of the private key. In a particular instance, AnonymizedID is for the same client ID, but they will be different in different transmissions.

Figure 8:
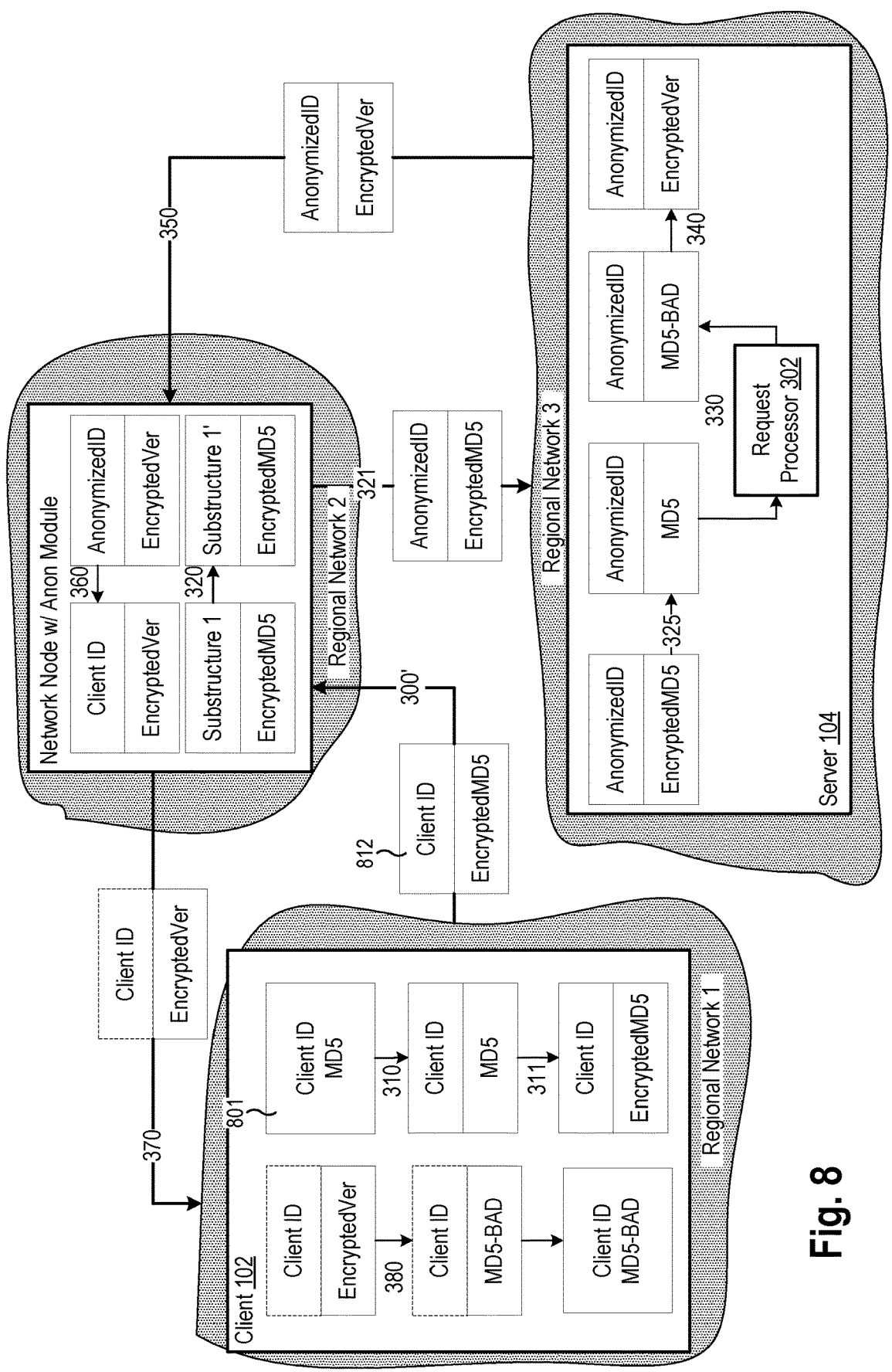
FIG. 8—illustrates an aspect of the method of data routing in a client-server architecture with identification of substructures in the data structure by the client.

FIG. 8 shows a variant of the example shown in FIG. 7. In this variant the step 310 after identification of the substructures is performed not by the anonymization module 108, but by the modification module 110 of the client 102 with later transformation of the substructure saving information about the file (the file's MD5) by encryption with the public key (in the figure the transformed information about the file is denoted as EncryptedMD5); the private key is kept at the server and the inverse transformation may be performed only at the server. Thus, step 300' of the example in FIG. 8 differs from the analogous step of the example in FIG. 7 in that it is not the original structure of the request (e.g., 801) which is sent to the node with the anonymization module 108, but rather the transformed one (data structure 812), after performing steps 310 and 311. Accordingly, therefore, step 325 is added, where prior to performing step 330 an inverse transformation is done for the encrypted information about the file by decrypting it with the aid of the private key.

Figure 9:
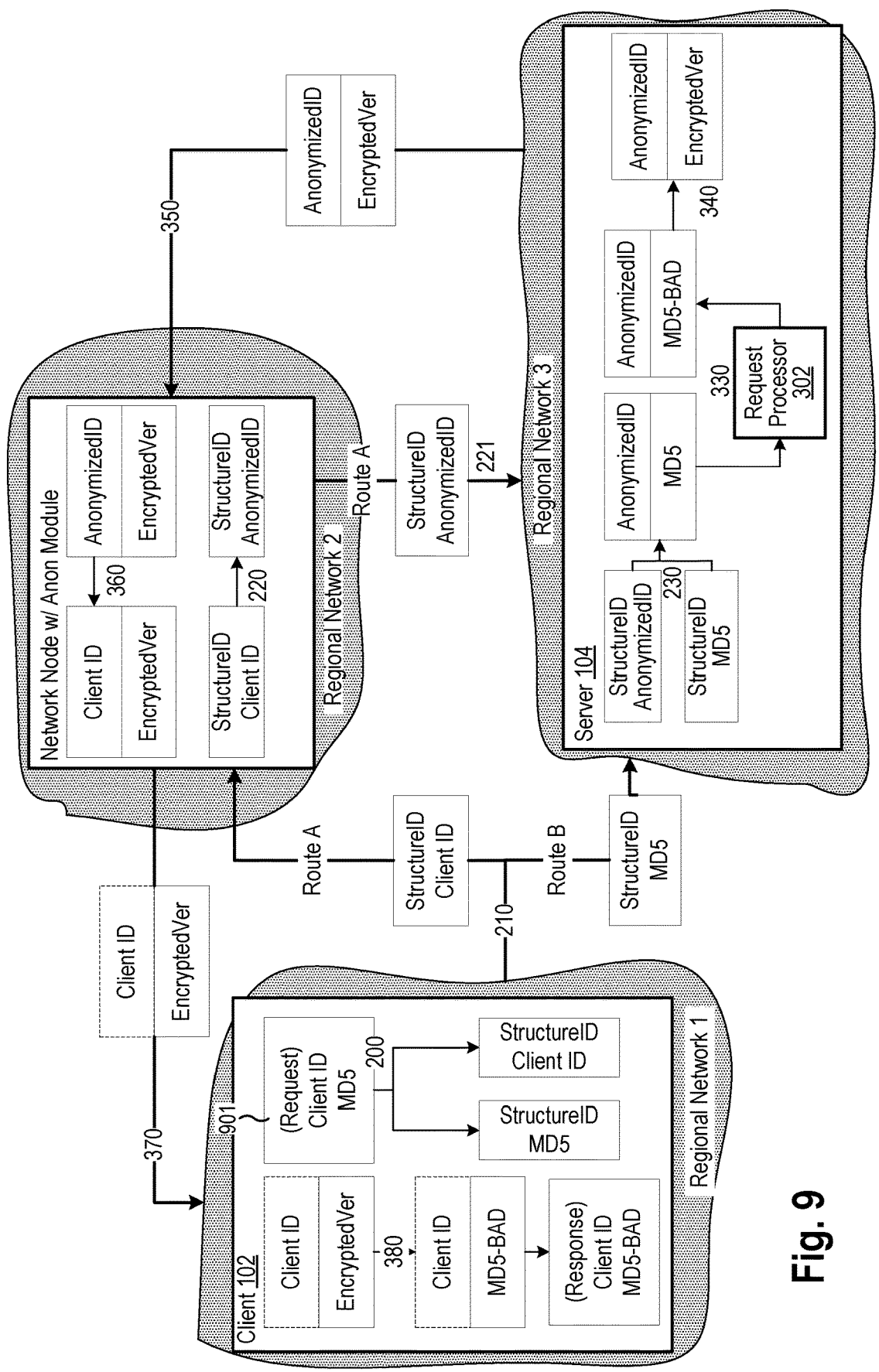
FIG. 9—illustrates an aspect of the method of data routing in a client-server architecture when executing a request with division of the data structure into substructures by the client.

FIG. 9 shows an example of data routing in a client-server architecture in which steps 200 to 230 are analogous to the steps of the example shown in FIG. 6a, while steps 330 to 380 are analogous to the steps of the example shown in FIG. 7. In a particular instance, the information about the file may first be transformed prior to being dispatched directly to the server, by analogy with step 311 in the example of FIG. 8, so that step 325 is added in the example, besides step 311.

The modification module 110 of the client intercepts the structures 901 intended for dispatch to the server, divides these structures in accordance with established rules, and selects routes for these substructures also in accordance with rules. The rules by which the modification module 110 functions are established in a particular instance according to one or more information technology policies configured to comply with the existing regulations and legislation in the jurisdiction of which the client device 102 (the source) is operating. Therefore, in order to apply the rules the modification module 110 of the client determines the location of the device (source), the type of data in the formed data structure 901, the purpose of the data structure (e.g., the type of transmission: request or statistics, where dispatching of data to the server for compilation of statistics at the server side), the location of the data recipient. On this basis in accordance with the rules the modification module 110 selects the route for the data, the division variant, and the method of transformation at the client side. One variant of formalized rules is presented in Table 1, where the "Method" column indicates the correlated method for transforming can include the following approaches: "Method 1" is characterized as including the division of a data structure at the client side (see FIG. 2); "Method 2" is characterized as including the identification of the data structure at the node with the anonymization module 108 (see FIG. 3); "Method 3" is characterized as including the identification of the data structure at the client side (see FIG. 4).

As indicated above, the rules may be given by the requirements of regulations/legislation (such as the GDPR) and just like any given legal norm include a hypothesis and a disposition, which corresponds in algorithmic language to an if-then construction. Thus, the provided Table 1 formalizes a rule in the following format:

IF [type, source, recipient, personally identifiable information (yes/no)], THEN [method, location of anonymization node, method of transformation for the data]

Figure 11:
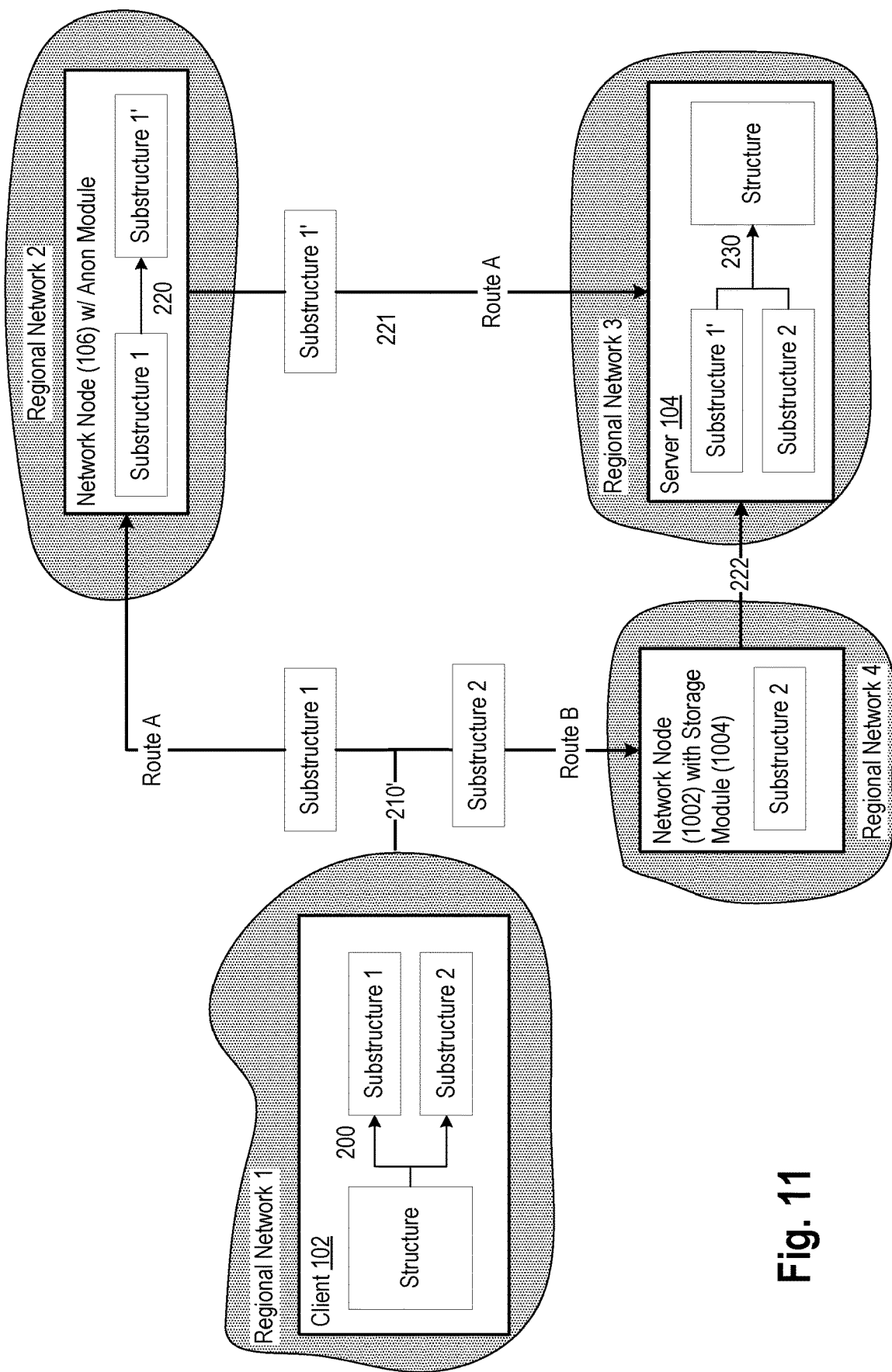
FIG. 11—illustrates a variant of a method of data exchange in a client-server architecture, which is used to obtain data from clients in order to compile statistics on the server side.

Consider an example data structure, in which the modification module 110 determines that: the type of transmission is a request, the source (client) is Germany, the recipient (server) is the Russian Federation, and the structure contains personally identifiable information. In accordance with the rules, the modification module 110 identifies the substructure with PII at the client side (as in step 310 of FIG. 4—method 2) and dispatches it via the USA, encrypts the substructure without PII by the public key (as in step 311 of FIG. 4), and transforms the personally identifiable information by the anonymization module 108 by encryption.

including for the transmission of data from clients which are used to compile statistics and for client-server interaction of the "request-response" type. FIG. 11 shows the method of anonymous exchange of data between a client and a server, which in a particular instance is used to obtain data from clients for the compilation of statistics on the server side. The steps 200, 221, 220, 230 are analogous to the steps shown in FIG. 2. Step 210' differs from the analogous one and step 222 is added. In FIG. 2 route B went directly from client to server, but in the aspect being described in FIG. 11 this route is broken up, and the client dispatches Substructure 2 not to the server, but to the node with the storage module 1004. Then, in step 222 this substructure will be received by the server. The initiator of the transmission of this substructure to the server in step 222 may be either the node 1002 with the storage module 1004 or the server 104, which downloads the Substructure 2 on demand when it receives via route A the Substructure 1' with the identifier of Substructure 2 that was saved by the network node 1002 with storage module 1004.

Figure 12:
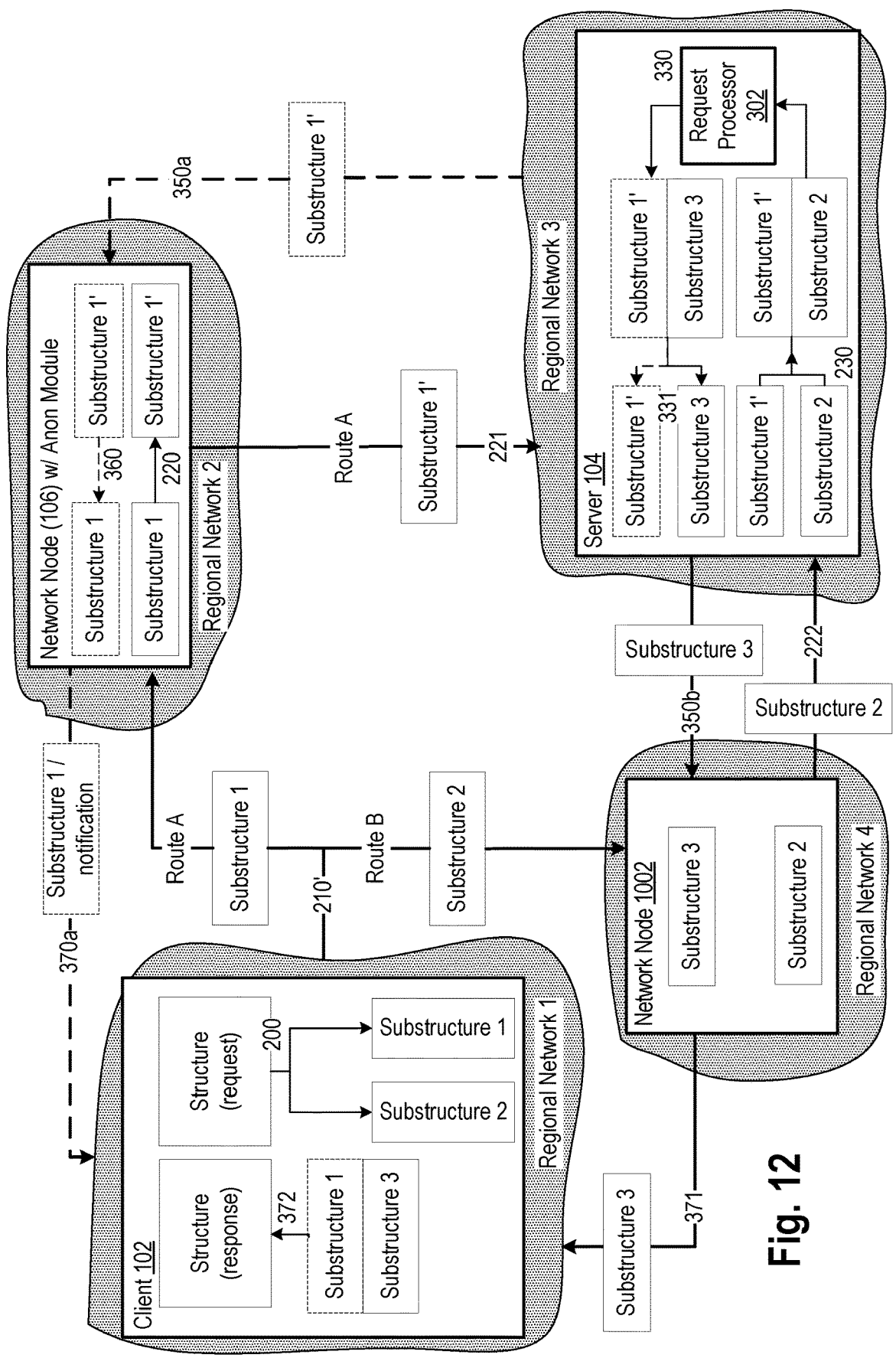
FIG. 12—illustrates a variant of the method of data exchange, which is used when executing a request of the client to the server.

FIG. 12 shows a method of data exchange which is used in a particular instance for executing a request of a client to the server. The steps 200, 221, 220, 230 are analogous to the steps shown in FIG. 2, the steps 210', 222 are analogous to the steps shown in FIG. 11, the step 330 is analogous to this

TABLE 1

Rules for Modification Module

| № | Rule hypothesis (if) | | | | | Rule disposition (then) Output | | | | | |
|---|---|---|---|---|---|---|---|---|---|---|---|
| | Type | | Source/recipient | | | Routing | | | Transformation | | |
| | Request | Statistics | Client | Server | PII | Method | | | Node with anonymization module in regional network | PII Encryption | Encryption Tokenization | oof non-PII |
| | | | | | | 1 | 2 | 3 | | | | |
| 1 | | + | USA | Russia | + | + | | | USA | | + | + |
| 2 | + | | | | + | | + | | Germany | + | | |
| 3 | | + | Germany | Russia | + | + | | | Germany | | + | + |
| 4 | + | | | | + | | | + | USA | + | | |

Figure 10:
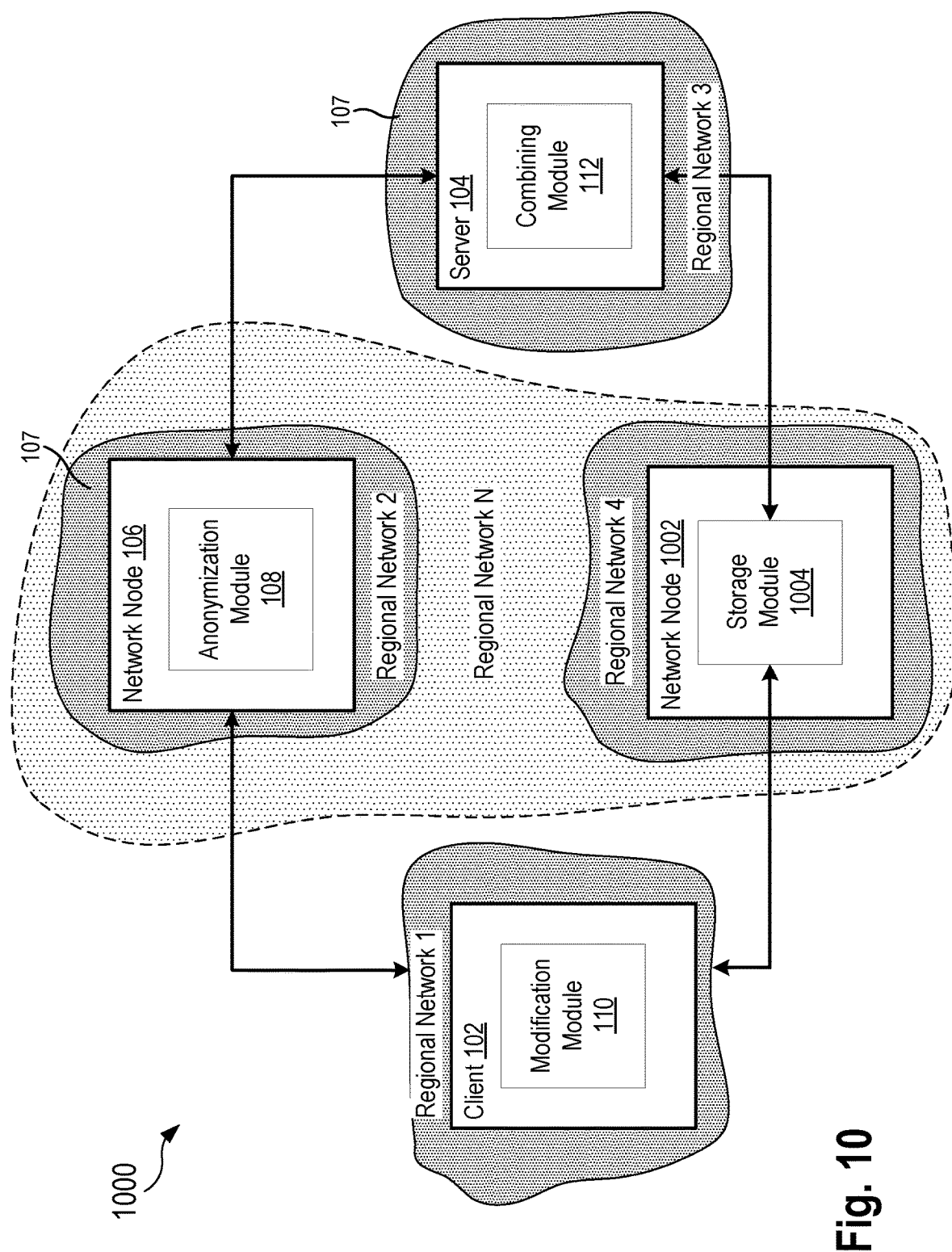
FIG. 10—illustrates a system of anonymous data exchange in a client-server architecture.

FIG. 10 illustrates a variant system 1000 of anonymous data exchange in a client-server architecture, similar to the system shown in FIG. 1, except the system 1000 includes a network node 1002 with a storage module 1004. The storage module 1004 may include one or more storage devices. The network node 1002 with the storage module 1004 is situated in a regional network 107 different from the regional network in which the server is located and is not in the same intranet as the server or the client. In a particular instance, the network node 1002 with the storage module 1004 may be in the same regional network as the network node 106 with the anonymization module 108; such a network is indicated in FIG. 10 as "Regional Network N". The purpose of the network node 1002 with storage module 1004 is to hide the external IP address of the client 102 from the server 104 and relieve the burden of the node 106 where the anonymization module 108 is located, so that the volume of traffic passing through the node 106 with the anonymization module 108 is reduced. The network node 1002 with the storage module 1004 is an intermediate repository for data being exchanged by the client with the server.

The system 1000 shown in FIG. 10 is used for the anonymous exchange of data between a client and a server, same step in FIG. 3. Thus, the dispatching of a request to the server is analogous to the dispatching of data to the server for the compilation of statistics, as shown in FIG. 11; the distinctions from all that was described above include how the response, prepared in step 330, is dispatched. The structure of the response to the request, formulated in step 330, is broken up into at least two substructures in step 331: (1) at least one substructure containing PII transformed by the anonymization module 108 (e.g., Substructure 1', extracted from the request structure); and (2) at least one substructure not containing PII (e.g., Substructure 3, containing the body of the response to the request or the payload of the response).

In step 350a the substructure containing PII is dispatched from the server 104 to the 106 node with the anonymization module 108, where in step 360 a transformation will be performed which is the inverse of the transformation performed in step 220. The substructure not containing PII (in FIG. 12 Substructure 3) is dispatched in step 350b to the network node 1002 with the storage module 1004. Next, the substructure not containing PII will be sent to the client in step 371. Variants whereby the client receives the substructure in step 371 may be different. If step 350*a* is carried out, then after the transformation in step 360 the node with the anonymization module 108 will dispatch a notification (message) to the client in step 370*a* that the response is ready; after this, the client accesses the node with the storage module 1004 and receives the substructure not containing PII from the node with the storage module 1004. The notification in step 370*a* may contain, for example, a unique identifier assigned to the Substructure 3 in the process of dividing the structure of the response to the request in step 331, the substructure with this identifier being requested by the client from the network node 1002 with the storage module 1004. In a particular instance, steps 350*a*, 360, 370*a* might not be performed. In this case, the identifier assigned to the substructures in the process of division in step 200 will be analogous to the identifier assigned in step 331 and the client in step 371 will obtain the Substructure 3 by periodically polling the node with the storage module 1004 as to the arrival there of the substructure with the corresponding identifier. If steps 350*a*, 360, 370*a* are not performed, the structure of the response to the request is identical to the substructure not containing PII (Substructure 3), to which a unique identifier is assigned. In another particular instance, the node with the storage module 1004 independently dispatches the Substructure 3 to the client in step 371; in this case, the session identifier is used, which was established between the client and the node with the storage module 1004 to carry out step 210; in the given case, the unique identifiers assigned to the substructures in steps 200 and 331 are equal and they are equal to the session identifier. In this case, when the node receives the Substructure 3 in step 350*b*, it will read the identifier of Substructure 3 and forward it to the client whose session has the same identifier; the primary condition for the performance of this variant is the maintaining of the session between client and node with the storage module 1004 until the end of the data exchange between the client and the server when executing the request and dispatching the response.

Figure 12A:
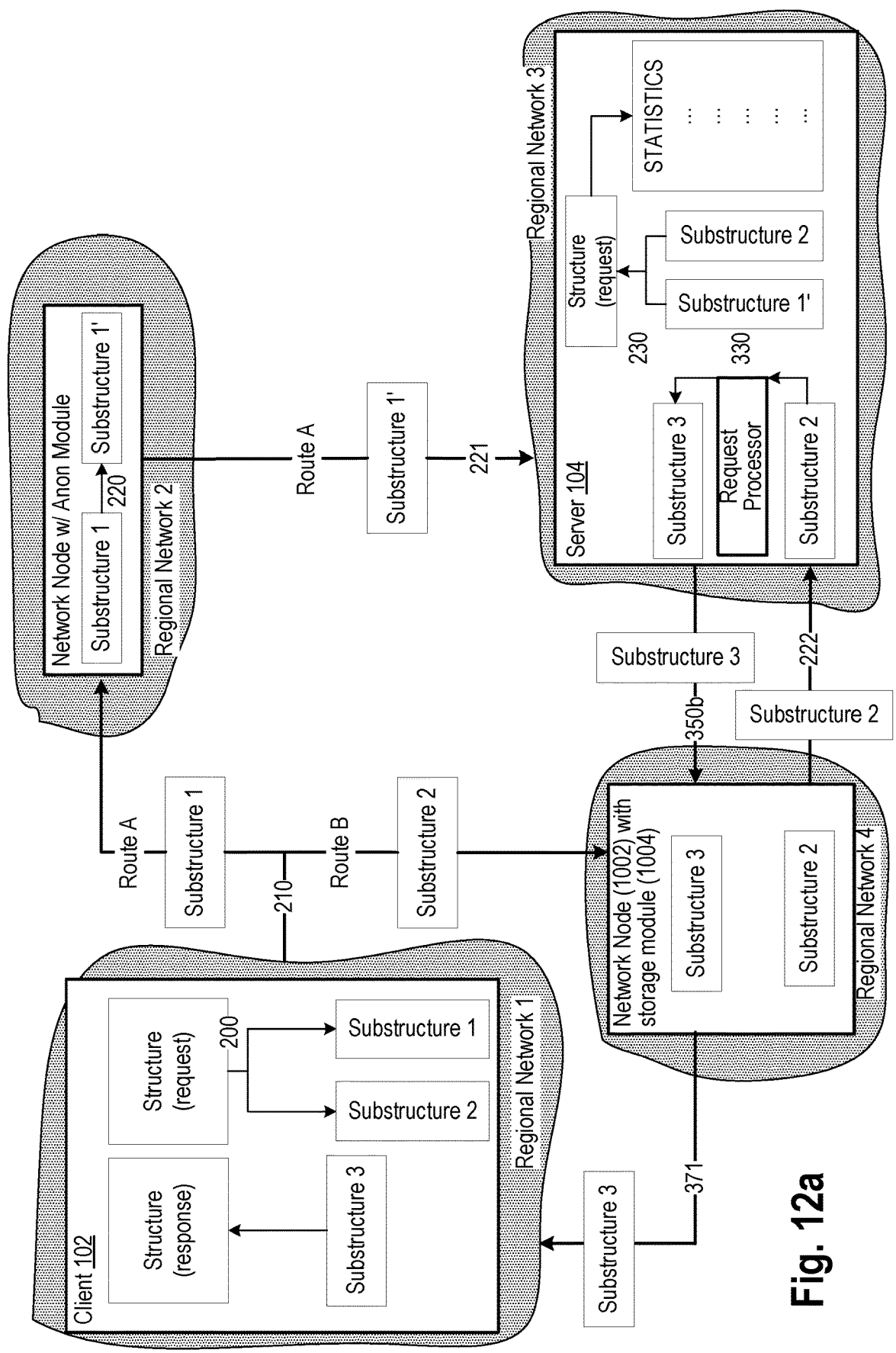
FIG. 12A—illustrates a variant of the method of data exchange, which is used when executing a request of the client to the server, and includes a combining of substructures.

In a particular instance, the scheme described in FIG. 12 may operate in an asynchronous mode; in this case, step 330 is carried out without performing step 230, the data of Substructure 2 is used, and the obtained Substructure 3, omitting step 331, is dispatched to the node with the storage module 1004 (step 350*b*). Step 230 will be performed independently of step 330. Such a mode increases the speed of the server's response and is used in the event that only the data contained in the substructure not containing CD is needed for the processing of the request. A combining of the substructures (step 230) in such cases is only necessary to compile statistics, as in the example shown in FIG. 12*a*.

Figure 13:
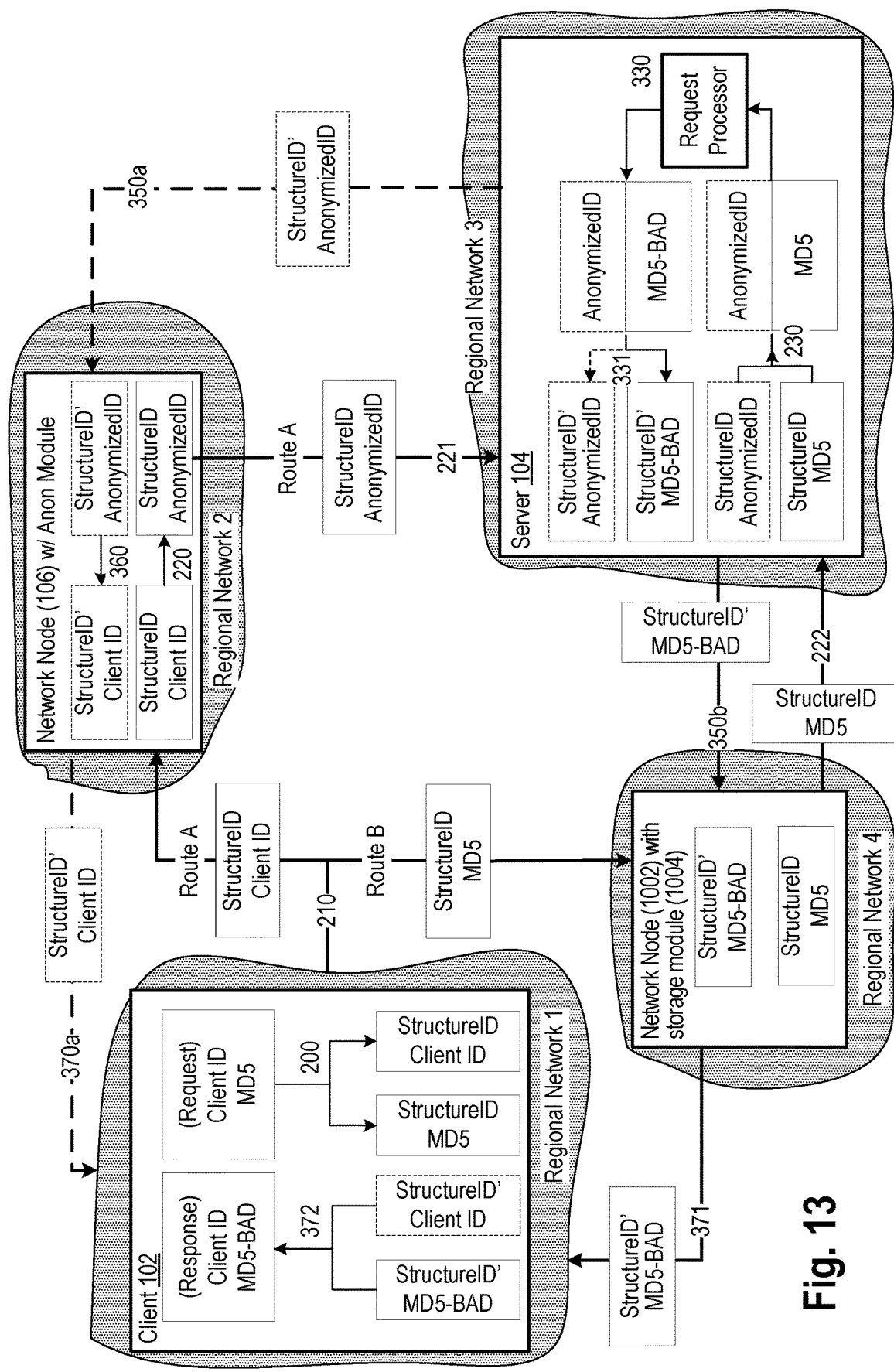
FIG. 13—illustrates an exemplary aspect of the method of data exchange, when executing a request of the client to the server.
Figure 13A:
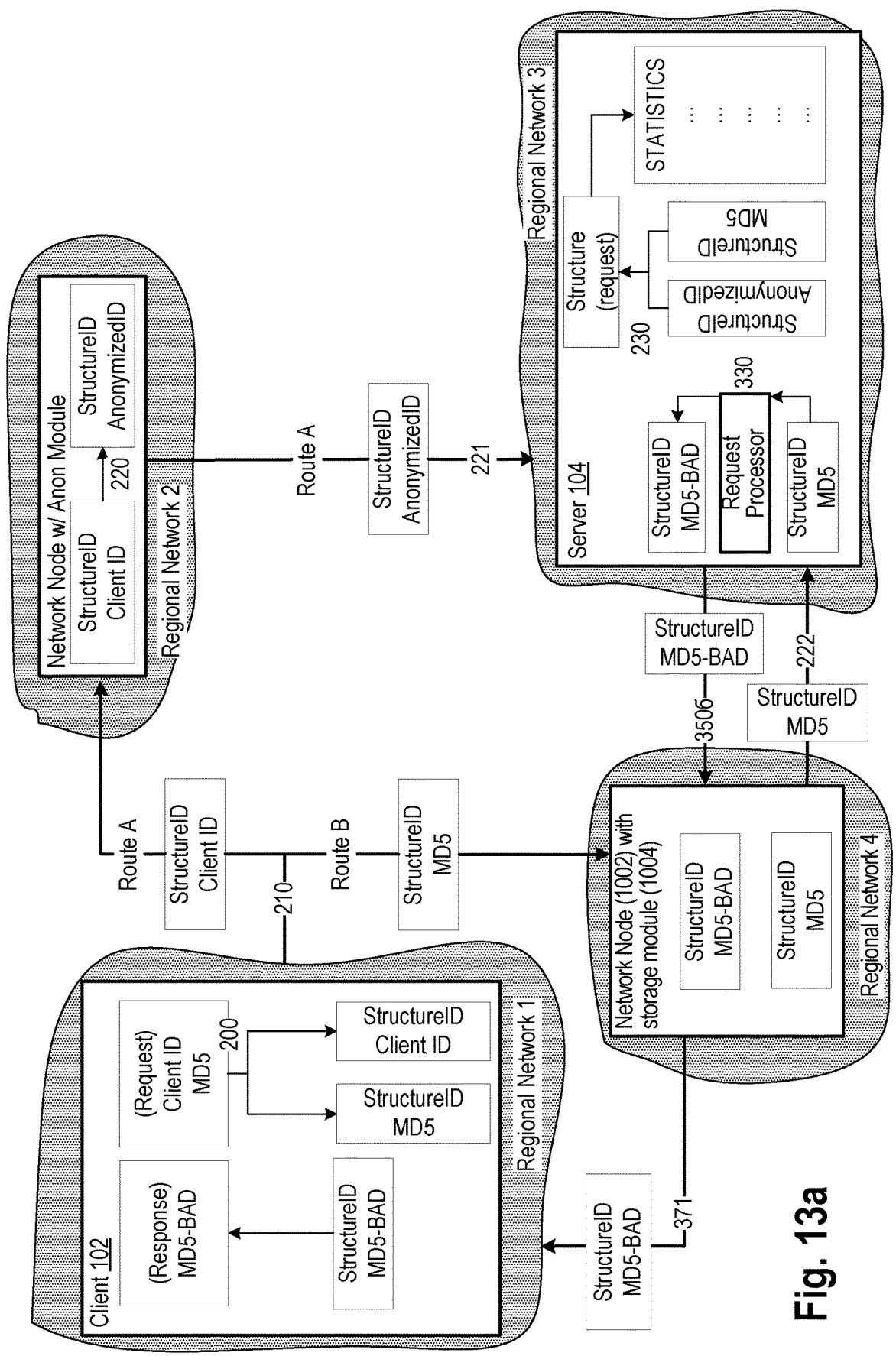
FIG. 13A—illustrates an exemplary aspect of the method of data exchange, when executing a request of the client to the server in asynchronous mode.

FIG. 13 shows an example of the use of the method illustrated in FIG. 12 in order to obtain a verdict (dangerous/malicious or safe) for a file detected on the client side from the server. For the transmission to the server of information about the detected file (in the present example, the information about the file is the MD5 of the file), a data structure is formed which includes the client ID and the MD5 of the detected file. In step 200 the modification module 110 divides the formulated structure, intended for transmission to the server, into substructures, obtaining as a result of the division a substructure containing the client ID and a substructure containing the MD5 of the file; in order to know which structure the substructures are a part of, they are assigned an identifier (in the figure the identifier is denoted as StructureID). In step 210 the modification module 110 of the client dispatches the obtained substructures. The dispatching is done by different routes (route A and route B) and to different recipients. Via route A the substructure is dispatched to the server, route A including the network node with the anonymization module 108, said node being situated in a regional network different from the network where the server is located, and not being in the same intranet as the server or the client. The substructure containing the client ID is sent to the server via the node with the anonymization module 108 (route A). Via route B the substructure is dispatched to the network node 1002 with the storage module 1004, said node being situated in a regional network different from the network where the server is located, and not being in the same intranet as the server or the client. The substructure containing the MD5 of the file is sent to the network node 1002 with the storage module 1004 (route B). In step 220 the anonymization module 108 is used to perform a transformation of the client ID, where the client ID is saved at the node, and it replaces this in the substructure with the token AnonymizedID (in a particular instance, the client ID may be encrypted). The obtained substructure is dispatched to the server (step 221). In step 222 the substructure with the MD5 of the file will be received by the server. If the method is carried out in synchronous mode, then in step 230 the substructures obtained by the server in step 221 and step 222 will be combined and the response will be processed in step 330. In the example, MD5 will be scanned according to a base of malicious and safe files and according to the results of the scan a verdict will be produced and a response formulated to the request (in the given example, the file proved to be malicious—MD5-BAD). The formulated response to the request is divided in step 331 into two substructures, as a result of the division one obtains a substructure containing the client ID and a substructure containing the verdict (MD5), in order to know which structure the substructures are a part of, they are assigned an identifier (denoted in the figure as StructureID); in a particular instance, the identifier may be identical to the identifier assigned to the substructures in step 200. In step 350*b* the substructure with the verdict is dispatched to the network node 1002 with the storage module 1004, which either forwards the substructure to the client in step 371 (if StructureID corresponds to the session ID between the node and the client established in step 210), or it is saved until needed. This substructure may be needed by the client in event of receiving a notification from the node with the received anonymization module 108 of the clients as a result of the execution of steps 350*a*, 360, 370*a*. In another aspect, the client may constantly poll the network node 1002 with the storage module 1004 as to the presence of the response substructure at the node (in this case, the StructureID assigned to the substructures in steps 200 and 331 should be identical). In step 372 the client processes the response. If the method is carried out in asynchronous mode (FIG. 13*a*), then step 230 and step 330 are performed independently. The StructureID in step 330 does not change and is identical to the StructureID in step 200, and in a particular instance is equal to the session ID between the client and the node with the storage module 1004 of step 210, in which context a transmission of the substructure will also take place in step 371.

Aspects of the present disclosure make it possible to decentralize the data coming from a client, which provides anonymity for the user whose device is the client; the data being exchanged by the client with the server cannot be associated with the client upon accessing the server. Some of the data is known only to the server, some only to the network node with the anonymization module 108, and the data cannot be de-anonymized without simultaneous access to these system components, while the impossibility of simultaneous access to the components, including by government structures, is assured by distributing the system components among different regional networks, differing both in geographical respect and in respect of territorial jurisdiction. Aspects of present disclosure, when utilizing a node with a storage module 1004, also allow the external IP address of the client to be hidden from the server (the server does not pick up the substructure directly from the client, but instead via the node with the storage module 1004), and also reduces the burden on the node with the anonymization module 108.

In the present disclosure, the terms modification module, anonymization module, combining module, request processor, attack detection module, and storage module are understood to mean real-world devices, systems, components and groups of components, realized with the use of hardware such as integrated microcircuits (application-specific integrated circuit, ASIC) or a field-programmable gate array (FPGA) or for example in the form of a combination of software and hardware, such as a microprocessor system and a set of program instructions, and also on the basis of neuromorphic chips (neurosynaptic chips). The functionality of said means may be realized solely by hardware, and also in the form of a combination, where some of the functionality is realized by software and some by hardware. In certain variant aspects the modules may be executed on the processor of a computer (such as the one shown in FIG. 14). The databases may be realized by every possible method and may be contained either on a single physical medium or on different ones, both local and remote.

Figure 14:
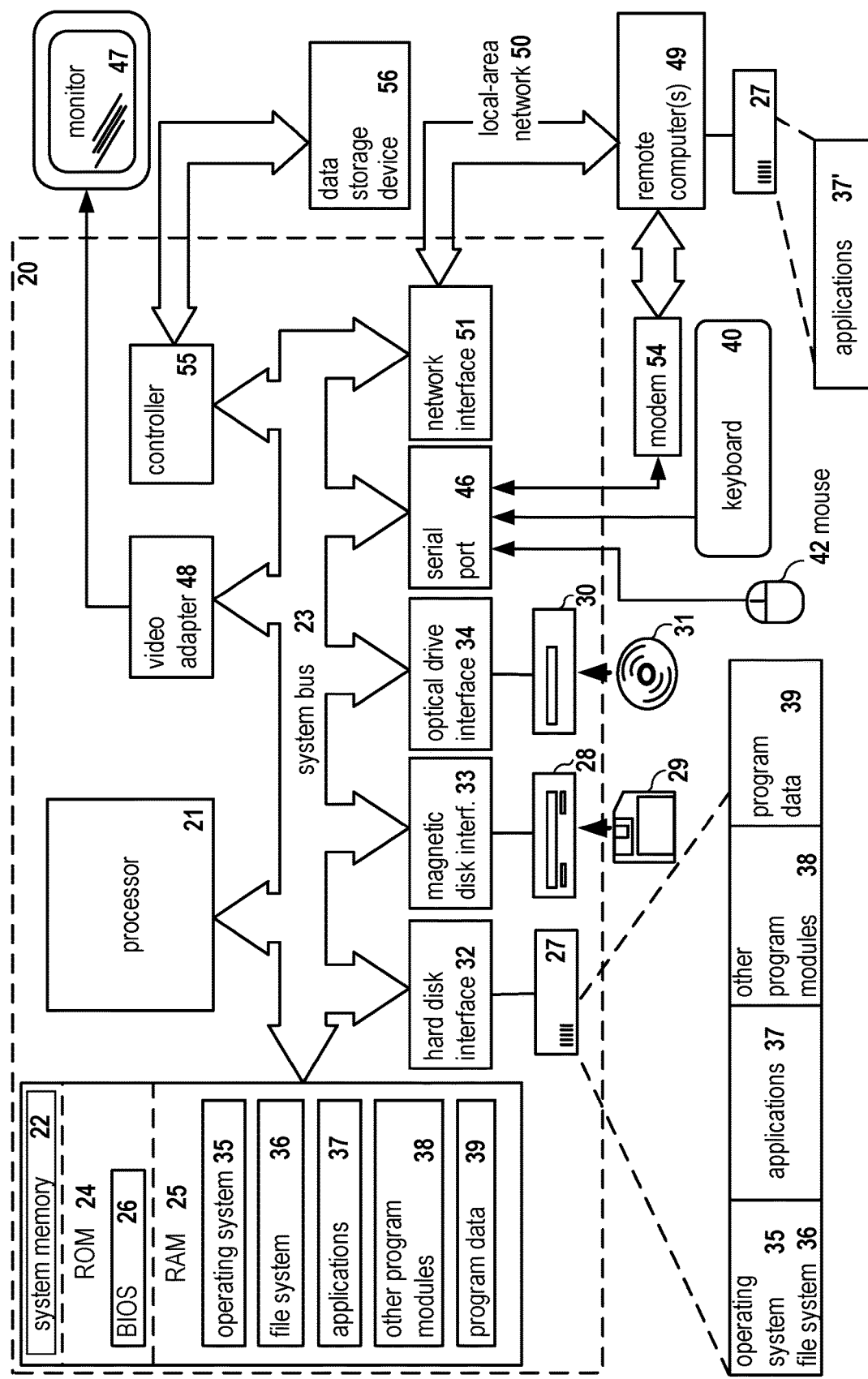
FIG. 14—illustrates an example of a computer system on which the disclosed system and method can be implemented according to an exemplary aspect.

FIG. 14 is a block diagram illustrating a computer system 20 on which aspects of systems and methods for transmitting data in a client-server architecture may be implemented in accordance with an exemplary aspect. It should be noted that the computer system 20 can correspond to the client 102, server 104, network nodes 106 and 1002, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 14, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for anonymously routing data between a client and a server, the method comprising:
   receiving, by a network node, a request data structure from the client,
      wherein the network node is located in first regional network different from a second regional network in which the server is located and not being in a same intranet as the server and the client, wherein the first regional network and the second regional network are located in different legal jurisdictions;
      wherein the request data structure includes at least two substructures: a first substructure containing critical data, and a second substructure that does not contain critical data, wherein the critical data comprises data for which legal jurisdiction in which the client is located imposes restrictions on gathering, storing, accessing, disseminating and/or processing data;
   performing, by the network node, a transformation on the critical data of the first substructure using a one-way function such that the server cannot perform an inverse transformation on the critical data of the first substructure; and
   routing, by the network node, the request data structure with the transformed first substructure containing the critical data to the server,
   receiving, by the network node, a response data structure from the server, wherein the response data structure includes a third substructure containing the transformed critical data and a fourth substructure not containing critical data, wherein a transformation of data of the fourth substructure of the response data structure not containing critical data is performed at the server; and
   performing, by the network node, an inverse transformation of the transformed critical data of the third substructure of the response data structure and routing the response data structure to the client, wherein the transformation and the inverse transformation are performed using asymmetrical encryption and wherein the inverse transformation of data of the fourth substructure of the response data structure not containing critical data is performed by the client.

2. The method of claim 1, wherein the transformation of the data of the fourth substructure by the server performed by a one-way function such that the network node cannot perform an inverse transformation on the data of the fourth substructure.

3. The method of claim 1, wherein the transformation of data of the fourth substructure of the response data structure not containing critical data is performed using asymmetrical encryption, where a private key is stored at the client and a public key is stored at the server.

4. The method of claim 1, wherein the transformation includes encryption.

5. The method of claim 4, wherein the transformation comprises an encryption of the at least two substructures at the server, and the inverse transformation comprises a decryption of the at least two substructures by the client.

6. The method of claim 1, wherein the first substructure containing critical data and the second substructure not containing critical data in the request data structure are identified by the client prior to being dispatched to the server across the network node.

7. The method of claim 6, wherein the second substructure that does not contain critical data is transformed by the client.

8. The method of claim 7, wherein an inverse transformation of the second substructure not containing critical data is performed by the server prior to formulating the response data structure.

9. The method of claim 1, wherein the response data structure dispatched to the client does not include the first substructure containing critical data.

10. The method of claim 1, wherein the critical data comprises personally identifiable information.

11. The method of claim 1, wherein the critical data comprises confidential data, wherein confidential data is data kept in accordance with laws of a country in whose legal jurisdiction a user of the client is located.

12. A system for anonymously routing data, wherein the system comprises:
   a client, a server, and a network node situated in a first regional network different from a second regional network in which the server is located and not being in a same intranet as the server and the client when making a request, wherein the first regional network and the second regional network are located in different legal jurisdictions;

wherein the network node is configured to receive a request data structure from the client, wherein the request data structure includes at least two substructures: a first substructure containing critical data and a second substructure that does not contain critical data, wherein the critical data comprises data for which a legal jurisdiction in which the client is located imposes restrictions on gathering, storing, accessing, disseminating and/or processing data;

wherein the network node is configured to perform a transformation on the critical of the first substructure using a one-way function such that the server cannot perform an inverse transformation on the critical data of the first substructure;

wherein the network node is configured to route the request first data structure with the transformed substructure containing the critical data from the client to the server, wherein the network node is configured to receive a response data structure from the server, wherein the response data structure includes a third substructure containing the transformed critical data and a fourth substructure not containing critical data and wherein a transformation of data of the fourth substructure of the response data structure not containing critical data is performed at the server, wherein the network node is configured to perform an inverse transformation of the transformed critical data of the third substructure of the response data structure and route the response data structure to the client, wherein the transformation and the inverse transformation are performed using asymmetrical encryption and wherein the inverse transformation of data of the fourth substructure of the response data structure not containing critical data is performed by the client.

13. A non-transitory computer readable medium comprising computer executable instructions for anonymously routing data between a client and a server, including instructions for:

receiving, by a network node, a request data structure from the client, wherein the network node is located in first regional network different from a second regional network in which the server is located and not being in a same intranet as the server and the client, wherein the first regional network and the second regional network are located in different legal jurisdictions, wherein the request data structure includes at least two substructures: a first substructure containing critical data and a second substructure that does not contain critical data, wherein the critical data comprises data for which a legal jurisdiction in which the client is located imposes restrictions on the gathering, storing, accessing, disseminating and/or processing data;

performing, by the network node, a transformation on the critical data of the first substructure using a one-way function such that the server cannot perform an inverse transformation on the critical data of the first substructure;

routing, by the network node, the request data structure with the transformed first substructure containing the critical data from the client to the server;

receiving, by the network node, a response data structure from the server, wherein the response data structure includes a third substructure containing the transformed critical data and a fourth substructure not containing critical data and wherein a transformation of data of the fourth substructure of the response data structure not containing critical data is performed at the server; and performing, by the network node, an inverse transformation of the transformed critical of the third substructure of the response data structure and routing the response data structure to the client, wherein the transformation and the inverse transformation are performed using asymmetrical encryption and wherein the inverse transformation of data of the fourth substructure of the response data structure not containing critical data is performed by the client.

* * * * *